(12) United States Patent
Gooneratne et al.

(10) Patent No.: US 10,320,311 B2
(45) Date of Patent: Jun. 11, 2019

(54) HIGH TEMPERATURE, SELF-POWERED, MINIATURE MOBILE DEVICE

(71) Applicant: Saudi Arabian Oil Company, Dhahran (SA)

(72) Inventors: Chinthaka Pasan Gooneratne, Dhahran (SA); Bodong Li, Dhahran (SA); Shaohua Zhou, Cradoc (AU)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/457,076

(22) Filed: Mar. 13, 2017

(65) Prior Publication Data
US 2018/0262127 A1    Sep. 13, 2018

(51) Int. Cl.
*H02N 1/04*    (2006.01)
*H04B 1/40*    (2015.01)
(Continued)

(52) U.S. Cl.
CPC ........... *H02N 1/04* (2013.01); *E21B 41/0085* (2013.01); *E21B 47/00* (2013.01); *E21B 47/011* (2013.01);
(Continued)

(58) Field of Classification Search
CPC ...... E21B 41/0085; E21B 43/12; E21B 43/32; E21B 47/00; E21B 47/011; E21B 47/12; E21B 47/18; H02N 1/04
(Continued)

(56) References Cited

U.S. PATENT DOCUMENTS 5,839,508 A * 11/1998 Tubel .................. E21B 41/0085
                                                166/65.1
6,324,904 B1 * 12/2001 Ishikawa ............... E21B 47/011
                                                257/E29.022
(Continued)

FOREIGN PATENT DOCUMENTS

GB        2419362 A       4/2006
WO    WO2016185235 A1    11/2016

OTHER PUBLICATIONS

International Search Report and Written Opinion for International Application No. PCT/US2018/022099; International Filing Date Mar. 13, 2018; Report dated Jun. 20, 2018 (pp. 1-13).
(Continued)

*Primary Examiner* — Adnan Aziz
(74) *Attorney, Agent, or Firm* — Bracewell LLP; Constance G. Rhebergen; Vivek P. Shankam

(57) ABSTRACT

High temperature miniature mobile device includes a power generator including a first material of one polarity and a second material that is fixed in position and is of opposite polarity of the first material, wherein the first material is propelled towards or slid against the second material based on motion of the miniature mobile device so that the two materials have a maximized point of contact to generate maximum power, an electrode that is connected to the first material or second material, a bridge rectifier connected to the electrode to transform the power generated into direct current from alternating current, a storage unit for storing the power generated by the power generator, a sensor that gathers information concerning a downhole environment, and a microcontroller and transceiver unit to manage the power generated by the power generator and transmit information gathered by the sensor.

28 Claims, 14 Drawing Sheets

(51) Int. Cl.
*E21B 47/00* (2012.01)
*E21B 47/01* (2012.01)
*E21B 47/12* (2012.01)
*E21B 41/00* (2006.01)
*G01V 11/00* (2006.01)

(52) U.S. Cl.
CPC ............ *E21B 47/12* (2013.01); *G01V 11/002* (2013.01); *H04B 1/40* (2013.01)

(58) Field of Classification Search
USPC ...................................................... 340/854.6
See application file for complete search history.

(56) References Cited

U.S. PATENT DOCUMENTS

| | | | |
|---|---|---|---|
| 6,691,802 B2 | 2/2004 | Schultz et al. | |
| 6,745,833 B2 * | 6/2004 | Aronstam | E21B 47/01 |
| | | | 166/250.11 |
| 6,976,535 B2 | 12/2005 | Aronstam et al. | |
| 7,165,608 B2 | 1/2007 | Schultz et al. | |
| 7,190,084 B2 * | 3/2007 | Hall | E21B 41/0085 |
| | | | 290/1 R |
| 7,714,741 B2 | 5/2010 | Snider et al. | |
| 7,729,860 B2 | 6/2010 | Pabon et al. | |
| 7,849,919 B2 * | 12/2010 | Wood | H05H 1/52 |
| | | | 102/327 |
| 8,511,373 B2 | 8/2013 | Tosi et al. | |
| 8,581,427 B2 | 11/2013 | Schoonover | |
| 8,604,634 B2 | 12/2013 | Pabon et al. | |
| 8,714,239 B2 | 5/2014 | Tosi et al. | |
| 9,063,252 B2 | 6/2015 | Kamal et al. | |
| 9,115,573 B2 * | 8/2015 | Purkis | E21B 34/14 |
| 9,359,841 B2 * | 6/2016 | Hall | E21B 23/00 |
| 9,366,134 B2 | 6/2016 | Walton et al. | |
| 9,429,559 B2 * | 8/2016 | Radjy | B28C 7/02 |
| 9,732,879 B2 * | 8/2017 | Jaffrey | F16K 37/0083 |
| 9,822,631 B2 * | 11/2017 | Ravi | E21B 33/13 |
| 9,879,519 B2 * | 1/2018 | Roberson | E21B 47/00 |
| 2001/0054969 A1 * | 12/2001 | Thomeer | E21B 23/00 |
| | | | 340/853.3 |
| 2006/0016606 A1 * | 1/2006 | Tubel | E21B 41/0085 |
| | | | 166/386 |
| 2006/0064826 A1 * | 3/2006 | Kimball | A47L 13/38 |
| | | | 15/1.52 |
| 2008/0007421 A1 * | 1/2008 | Liu | G01V 11/002 |
| | | | 340/853.3 |
| 2008/0257546 A1 * | 10/2008 | Cresswell | E21B 47/04 |
| | | | 166/250.15 |
| 2008/0265712 A1 * | 10/2008 | Ulm | B60C 23/0411 |
| | | | 310/313 B |
| 2009/0038848 A1 * | 2/2009 | Garcia-Osuna | E21B 17/003 |
| | | | 175/40 |
| 2009/0101329 A1 * | 4/2009 | Clem | E21B 43/12 |
| | | | 166/66.6 |
| 2009/0166045 A1 | 7/2009 | Wetzel et al. | |
| 2009/0271117 A1 | 10/2009 | Ayoub et al. | |
| 2010/0133006 A1 * | 6/2010 | Shakra | E21B 41/0085 |
| | | | 175/24 |
| 2011/0050181 A1 * | 3/2011 | Post | H02N 1/04 |
| | | | 320/166 |
| 2011/0169276 A1 * | 7/2011 | Akamatsu | H02N 11/008 |
| | | | 290/1 R |
| 2011/0210645 A1 | 9/2011 | Mason | |
| 2012/0032560 A1 * | 2/2012 | Ochoa | E21B 41/0085 |
| | | | 310/339 |
| 2012/0146806 A1 | 6/2012 | Purkis | |
| 2013/0118733 A1 | 5/2013 | Kumar | |
| 2013/0155631 A1 * | 6/2013 | Yamauchi | H02N 2/181 |
| | | | 361/748 |
| 2014/0069639 A1 | 3/2014 | MacKenzie et al. | |
| 2014/0084748 A1 | 3/2014 | Wang et al. | |
| 2014/0210307 A1 * | 7/2014 | Tosi | E21B 41/0085 |
| | | | 310/309 |
| 2014/0246950 A1 | 9/2014 | Wang et al. | |
| 2014/0265580 A1 * | 9/2014 | Cooley | E21B 41/0085 |
| | | | 307/47 |
| 2014/0300248 A1 * | 10/2014 | Wang | G01L 9/0072 |
| | | | 310/300 |
| 2014/0338458 A1 | 11/2014 | Wang et al. | |
| 2015/0115748 A1 * | 4/2015 | Shimanouchi | H01L 41/125 |
| | | | 310/26 |
| 2015/0218885 A1 * | 8/2015 | Sitka | E21B 4/02 |
| | | | 175/57 |
| 2015/0330212 A1 * | 11/2015 | Sassi | E21B 47/065 |
| | | | 166/250.1 |
| 2016/0010427 A1 | 1/2016 | Kelbie et al. | |
| 2016/0252071 A1 * | 9/2016 | Phillips | F03B 13/20 |
| | | | 290/50 |

OTHER PUBLICATIONS

International Search Report and Written Opinion for International Application No. PCT/US2018/022107; International Filing Date Mar. 13, 2018; Report dated Jun. 20, 2018 (pp. 1-13).

\* cited by examiner

HIGH TEMPERATURE, SELF-POWERED, MINIATURE MOBILE DEVICE

BACKGROUND

1. Field

Embodiments of the present disclosure relate to systems and methods for wirelessly monitoring well conditions using high temperature, self-powered, miniature mobile devices including a power generator that generates power based on friction, generated by fluid or mud flow, between two materials of opposite polarity.

2. Description of Related Art

Background

Logging tools, such as wireline logging tools, MWD (measurement while drilling) and LWD (logging while drilling) are used to obtain information about the geological formations both inside and surrounding limited wellbore regions. The information obtained by these downhole measurement tools can be used to make various interpretations about the formations and conditions inside a well, which can then be used to make and revise drilling programs. Wireline and MWD/LWD tools have the ability to measure, either directly or indirectly, a wide range of measurements such as wellbore trajectory, and formation characteristics including resistivity, density, porosity, lithology, mineralogy, geological structure, permeability as well as geomechanical and fluid properties. Wireline tools have been used for many decades to obtain downhole wellbore and formation data.

In a wireline logging operation, a tool which contains several sensors are lowered into a well and data is obtained at various points inside a well until the tool reaches the bottom. Data is also obtained when the wireline tool is pulled out of the well. If the wireline logging tool is to be run for example after drilling an open hole, first, the drilling assembly has to be pulled out of hole. Then, the wireline operation also takes time, depending on the well depth and resolution of the data, to be run in the hole. Once the wireline logging is finished it has to be pulled out of the hole and the drilling assembly has to be run in hole again. Wireline logging is expensive due to the time spent on performing a wireline logging operation as well as the expensive sensors and packaging. During wireline operation, fluid in the wellbore typically remains static and the wellbore condition has to be in a favorable condition, if several logging runs are required, a dedicated wiper trip is required in between logging runs. Moreover, there is always the risk of a wireline logging tool getting stuck in the hole, which could significantly add to the cost of drilling a well.

MWD/LWD tools, as the names suggest, obtain measurements while drilling in real-time. MWD tools are especially important when drilling directional wells since they give the driller information about the trajectory of the well along with information such as tool downhole vibration, and gamma ray tool internal temperature. LWD tools on the other hand obtain information about the geological properties of the well and can be added to a bottom hole assembly depending on the formation evaluation requirements, such as resistivity, density etc. for the primary purpose identifying potential hydrocarbon bearing zone. The signals from the MWD/LWD tools are communicated to the surface by mud pulse telemetry and are recorded at the surface by pressure transducers, which are decoded immediately. MWD/LWD are very expensive, bulky and lengthy tools and mud pulse rate is generally slow (maximum of up to 20 bits/second in the field). The power to the MWD/LWD tools and the mud pulse telemetry unit is provided by batteries and recently by a downhole turbine/alternator. The power generation turbine, if installed close to the mud pulser and above the LWD tool, may prevent the retrieval of radioactive chemical sources in the LWD tool if the drilling bottom-hole assembly gets stuck and cannot be retrieved. It should be pointed out that the MWD/LWD tools are typically placed 35-60 feet away from the drill bit. Therefore, the driller does not have any information about the downhole environment at the bit.

Near-bit tools have gamma ray and inclination sensors 3-10 feet away from the bit but the number of sensors that can be placed near a bit is limited and the sensors are exposed extremely harsh environment, which may affect its performance and lifespan compared to sensor modules located further above the bit. If the drilling assembly contains a mud motor above the near-bit tools, additional data transmission means (data hoop from sensors to mud pulser) are needed to ensure real-time data transmission to surface, which adds considerable technical complexities and therefore prone to problems while operating the tools.

SUMMARY

Accordingly, example embodiments relate to a smart, miniature mobile device with integrated sensors and a communication module that can be injected into wells to evaluate, characterize downhole in-situ environments as well as carry commanding signals to downhole equipment. The present disclosure illustrates how miniature mobile devices (MMDs) provide clear advantages over current technologies such as wireline and MWD/LWD with respect to size, cost, sensitivity, power, mobility and potentially more downhole applications. Since the components are very small they require less power to operate, a significant advantage in downhole environments. A power generator based on in-situ downhole energy harvesting is designed to meet the lower power requirement of the MMDs. Batteries can also be used to provide power to the MMDs but batteries are not easily replicable and generally cease to function at high temperatures (>125° C.). The MMD is self-powered since both mechanical and hydraulic energies are harvested when a MMD flows with the wellbore fluid and this energy can be used to power the sensors, actuators and a communication module. The present disclosure provides several applications of these MMDs such as sensing, actuating, monitoring as well as transmitting and receiving data in a downhole environment.

One example embodiment is a smart, self-powered miniature mobile device (MMD) with a power generator, integrated sensors and a communication module that can be dropped/injected into wells from the surface to evaluate, characterize downhole in-situ environments as well as carry commanding signals to downhole equipment to activate/configure them as well as read data from them. The mobile devices have the possibility to get as close as possible to the geological formations to measure data since they travel with the mud, down through the drillstring, out of the nozzles and back up the annulus, providing a complete profile of the wellbore. Moreover, by sending several mobile devices downhole we can obtain high resolution/spatial data. The mobile devices can not only be released from the surface but also be released from any depth of the well or flow from the annulus, through the drillstring to the surface by reversing the flow. These MMDs have the ability to perform the same/similar functions as wireline logging and MWD/LWD tools but are smaller, more flexible, and more economical. Since the components are very small they require less power to operate, a significant advantage in downhole environments. A power generator based on energy harvesting is designed to meet the lower power requirement of the MMDs. Batteries can also be used to provide power to the MMDs but batteries are not easily replicable and cease to function at high temperatures. The MMD can be self-powered since both mechanical and hydraulic energies are harvested when a MMD flows with the mud and this energy can be used to power sensors, actuators and a communication module.

The power generator fully exploits the mechanical/hydraulic energies usually encountered in a drilling environment, such as vibration and mud flow, to generate friction between two materials. Vibration can be triggered directly by mechanical motion and mud flow and in-directly with the aid of mud flow and a mini-turbine. The power generator harvests energy and generate electricity by using friction between two materials of opposite polarities. Generating electricity by friction is based on the principle that an object becomes electrically charged after it contacts another material through friction. When they contact, charges move from one material to the other. Some materials have a tendency to gain electrons and some to lose electrons. If material A has a higher polarity than material B, then electrons are injected from material B into material A. This results in oppositely charged surfaces. When these two materials are separated there is current flow, when a load is connected between the materials, due to the imbalance in charges between the two materials. The current flow continues until both the materials are at the same potential. When the materials move towards each other again there is a current flow again, but in the opposite direction. Therefore, this contact and separation motion of materials can be used to generate electricity.

The method may also include a shell to house and protect the power generator, sensors, microcontroller/microprocessor and communication module of the MMD. The transceiver unit in the communications module may be configured to communicate over a wireless communication method selected from the group consisting of Wi-Fi, Wi-Fi Direct, Bluetooth, Bluetooth Low Energy, and ZigBee Another example embodiment is a system including MMDs coupled with the transceivers placed along a drill-string, where the data from the MMDs can be transferred almost immediately to the surface. The system includes a plurality of transceivers wirelessly connected to a computer on a drilling surface, each of the plurality of transceivers including a power generator including a first material of one polarity and a second material that is fixed in position and is of opposite polarity of the first material, wherein the first material is propelled towards or slid against the second material based on motion of the miniature mobile device so that the two materials have a maximized point of contact to generate maximum power, at least one electrode that is connected to the first material or second material, a bridge rectifier connected to the at least one electrode to transform the power generated into direct current from alternating current, a storage unit for storing the power generated by the power generator, at least one sensor that gathers information concerning a downhole environment, and a microcontroller and transceiver unit to manage the power generated by the power generator and transmit information gathered by the at least one sensor, wherein the at least one sensor is operatively coupled to the microcontroller. The system may also include a string of wireless transceivers placed along a drill string inside a well, each transceiver placed within at least half the maximum distance that each transceiver can transmit data and configured to communicate wirelessly with the plurality of high temperature miniature mobile devices. The string of wireless transceivers may be configured to receive measurement data from one of the high temperature miniature mobile devices, and transmit the measurement data to another wireless transceiver closer to the computer on the drilling surface. Therefore, gradients of important wellbore parameters such as pressure and temperature can be immediately established at the surface. This is one of the main advantages of the proposed system as the real-time/near real-time access to bottomhole data is of utmost importance to the driller to conduct a safe and efficient drilling operation.

The system may also include a first housing for housing the power generator, the electrode, and the bridge rectifier, wherein the first housing includes a polymeric material, and a second housing for housing the storage unit, the microcontroller, and transceiver unit, the second housing including a material selected from the group consisting of certain solids, transition metals, as well as high strength alloys and/or compounds of the transition metals, and high temperature dewars. The transceiver unit may be configured to communicate over a wireless communication method selected from the group consisting of Wi-Fi, Wi-Fi Direct, Bluetooth, Bluetooth Low Energy, and ZigBee.

The system may also include one or more downhole tools placed along a drill string inside a well that can be activated, deactivated, or configured by the high temperature miniature mobile device when the device is within a predetermined distance from the tool. A unique feature of this system is that a mobile device doesn't necessarily have to reach a bottomhole tool to activate/configure it. A signal can be simply sent along the transceiver channel from any depth to the bottomhole tool to activate/configure it. If the activation/configuration depends on the values of certain wellbore parameters at a certain depth, then the mobile device can flow to this depth, measure these parameters and send a signal based on the result to the downhole tool via the transceiver channel. The downhole tool can also be used for activating, deactivating, or configuring the high temperature miniature mobile device when the device is within a predetermined distance from the tool.

The system may also include a sleeve formed on an outer surface of a drill string, the sleeve adapted to move downwards in response to hydraulic or mechanical pressure, wherein the sleeve includes an outer valve for securing the plurality of high temperature miniature mobile devices in the body of the sleeve and releasing the plurality of high temperature miniature mobile devices when opened.

Another example embodiment is a method for wirelessly monitoring well conditions. The method may include wirelessly connecting a plurality of transceivers to a computer on a drilling surface, each of the plurality of transceivers including a power generator including a first material of one polarity and a second material that is fixed in position and is of opposite polarity of the first material, wherein the first material is propelled towards or slid against the second material based on motion of the miniature mobile device so that the two materials have a maximized point of contact to generate maximum power, at least one electrode that is connected to the first material or second material, a bridge rectifier connected to the at least one electrode to transform the power generated into direct current from alternating current, a storage unit for storing the power generated by the power generator, at least one sensor that gathers information concerning a downhole environment, and a microcontroller and transceiver unit to manage the power generated by the power generator, and transmitting information gathered by the at least one sensor, wherein the at least one sensor is operatively coupled to the microcontroller. The method may also include installing a string of wireless transceivers along a drill string inside a well, each transceiver being installed within at least half the maximum distance that each transceiver can transmit data, wherein the wireless transceivers are configured to communicate wirelessly with the plurality of high temperature miniature mobile devices. The string of wireless transceivers may be configured to receive measurement data from one of the high temperature miniature mobile devices, and transmit the measurement data to another wireless transceiver closer to the computer on the drilling surface. The method may also include installing one or more downhole tools along a drill string inside a well that can be activated, deactivated or configured by a high temperature miniature mobile device when the device is within a predetermined distance from the tool. The downhole tool can also be used for activating, deactivating, or configuring the high temperature miniature mobile device when the device is within a predetermined distance from the tool. The method may further include providing a sleeve on an outer surface of a drill string, the sleeve adapted to move downwards in response to hydraulic or mechanical pressure, wherein the sleeve includes an outer valve for securing the plurality of high temperature miniature mobile devices in the body of the sleeve, and releasing the plurality of high temperature miniature mobile devices upon opening the outer valve. The method may also include a first housing for housing the power generator, the electrode, and the bridge rectifier, wherein the first housing includes a polymeric material, and a second housing for housing the storage unit, the microcontroller, and transceiver unit, the second housing including a material selected from the group consisting of certain solids, transition metals, as well as high strength alloys and/or compounds of the transition metals, and high temperature dewars. The transceiver unit may be configured to communicate over a wireless communication method selected from the group consisting of Wi-Fi, Wi-Fi Direct, Bluetooth, Bluetooth Low Energy, and ZigBee.

Another example embodiment is a system of transceivers for wirelessly monitoring well conditions. The system includes a power generator including a first material of one polarity and a second material that is fixed in position and is of opposite polarity of the first material, wherein the first material is propelled towards or slid against the second material based on motion of the system so that the two materials have a maximized point of contact to generate maximum power, at least one electrode that is connected to the first material or second material, a bridge rectifier connected to the at least one electrode to transform the power generated into direct current from alternating current, a storage unit for storing the power generated by the power generator, at least one sensor that gathers information concerning a downhole environment, and a microcontroller and transceiver unit to manage the power generated by the power generator and transmit information gathered by the at least one sensor, wherein the at least one sensor is operatively coupled to the microcontroller.

Combining the MMD and the transceivers placed along a drillstring allows a number of other unique downhole operations. For example, mobile devices can be used to accurately locate the position of a dropped object and/or an object obstructing the drillstring. The mobile devices can be programmed to communicate with transceivers placed along a drillstring. Each time a MMD travels past a transceiver, the transceiver sends a signal to the surface confirming the location of the MMD. However, if there is an object obstructing the path of the MMD then the obstruction can be identified by the motion sensor of the mobile devices. Similarly, if there are areas where cuttings are accumulated in the annulus the mobile devices will fail to pass through these cuttings or will take a longer time to travel, which will be reflected in the time taken for the transceivers to transmit a signal indicating the mobile devices have passed its location.

BRIEF DESCRIPTION OF DRAWINGS

The foregoing aspects, features, and advantages of embodiments of the present disclosure will further be appreciated when considered with reference to the following description of embodiments and accompanying drawings. In describing embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments of the present invention. Like reference numerals refer to like elements throughout the specification.

DETAILED DESCRIPTION

The methods and systems of the present disclosure will now be described more fully hereinafter with reference to the accompanying drawings in which embodiments are shown. The methods and systems of the present disclosure may be in many different forms and should not be construed as limited to the illustrated embodiments set forth herein; rather, these embodiments are provided so that this disclosure will be thorough and complete, and will fully convey its scope to those skilled in the art. The term "high temperature" as referred to herein refers to temperatures above 125° C. unless otherwise noted.

Figure 1:
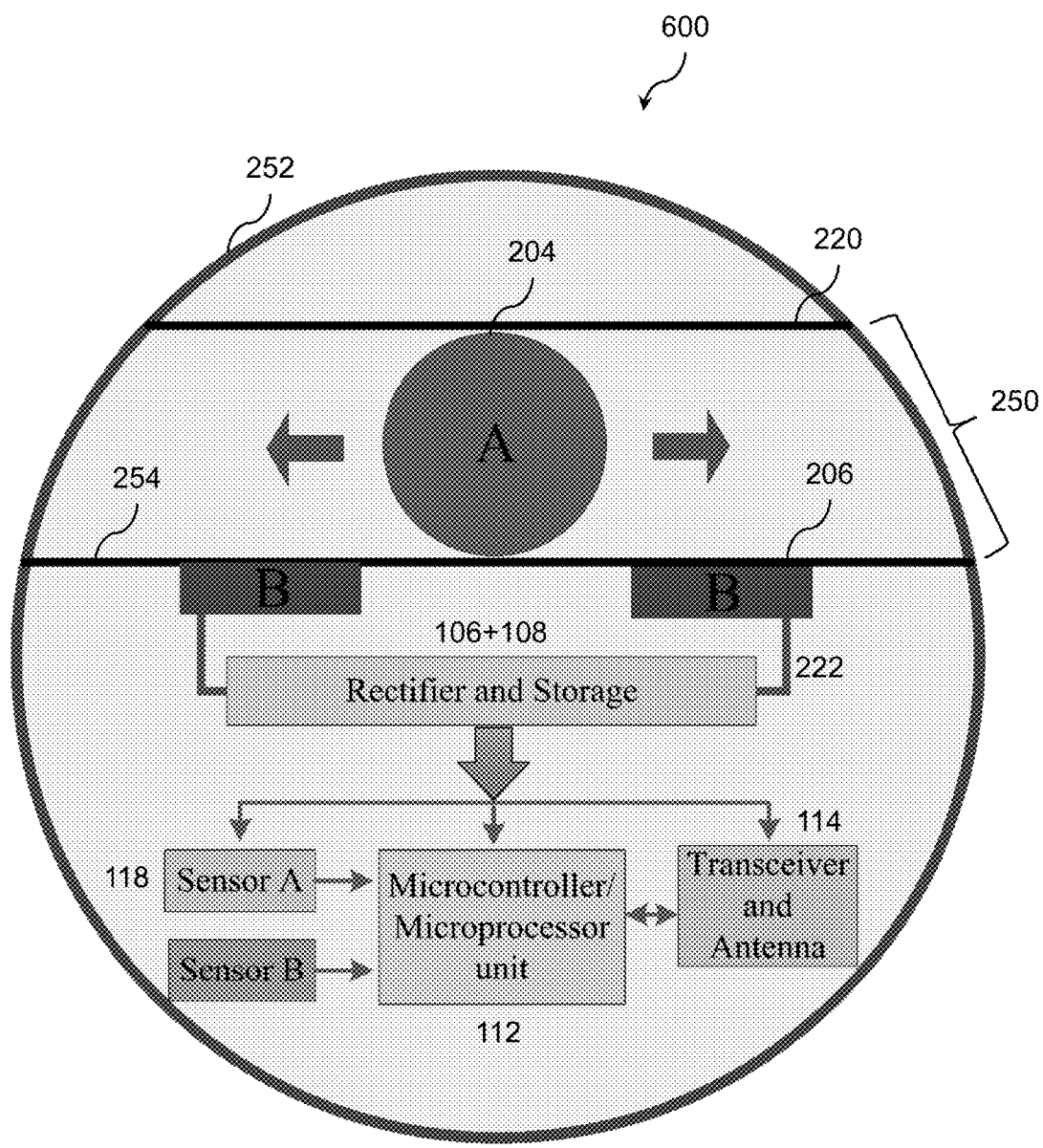
FIG. 1 is a schematic of a high temperature downhole miniature mobile device comprising a high temperature downhole power generator, sensors, microcontroller/microprocessor and a communications module, according to one or more example embodiments.

Turning now to the figures, FIG. 1 illustrates a smart miniature mobile device (MMD) 600 with a power generator 250, integrated sensors 118, microcontroller/microprocessor 112 and a communication module 114 that can be injected into wells to evaluate, characterize downhole environments as well as control downhole equipment. These MMDs have the ability to perform the same/similar functions as wireline logging and MWD/LWD tools but are smaller, more flexible, and more economical. Since the components are very small they require less power to operate, a significant advantage in downhole environments. A power generator based 250 on energy harvesting is designed to meet the lower power requirement of the MMDs. Batteries can also be used to provide power to the MMDs but batteries are not easily replicable and cease to function at high temperatures. The MMD 600 is self-powered since both mechanical and hydraulic energies are harvested when a MMD flows with the mud and this energy can be used to power the sensors 118, microcontroller/microprocessor 112, and a communication module 114.

Figure 2:
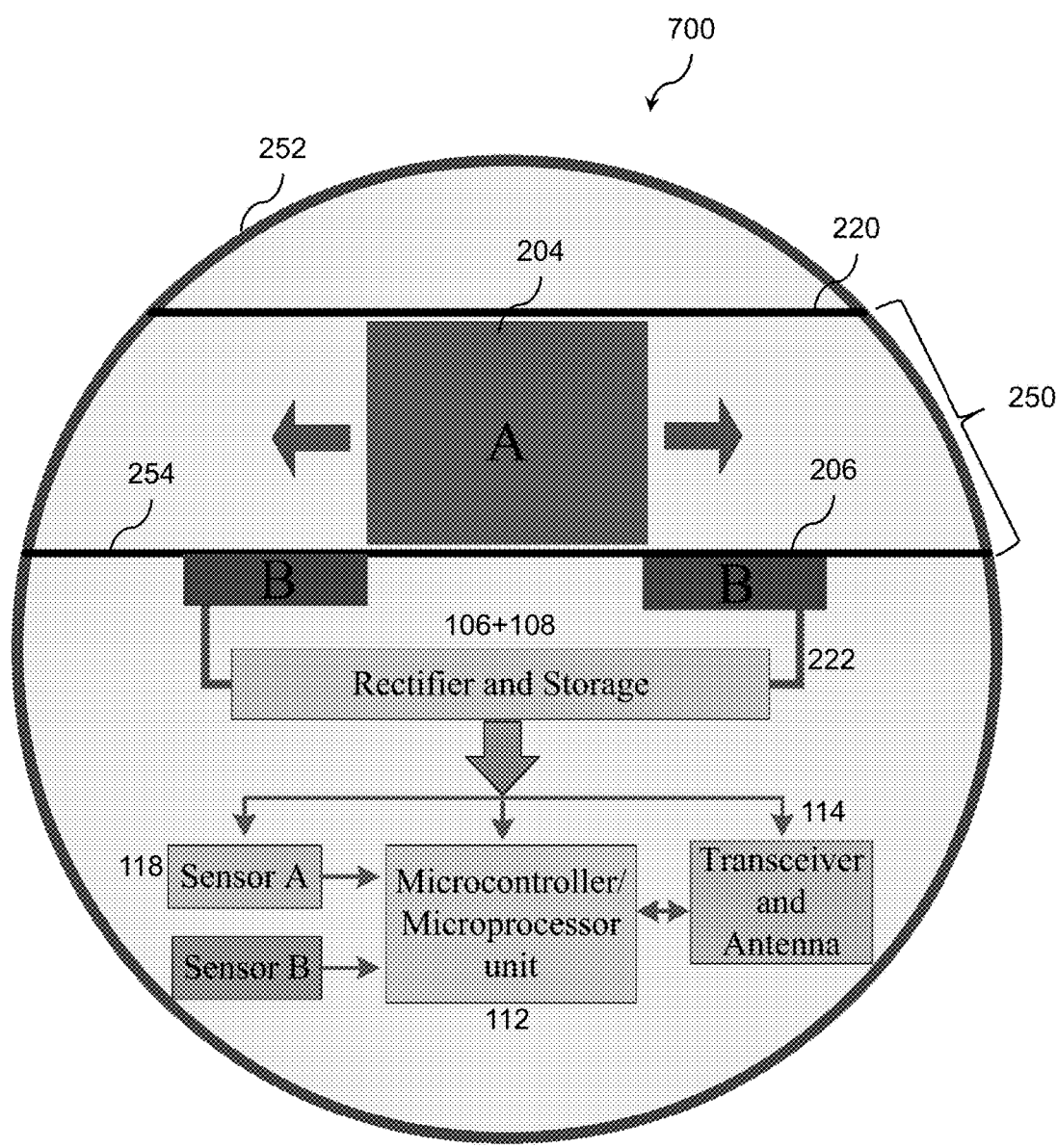
FIG. 2 is a schematic of a high temperature downhole miniature mobile device comprising a high temperature downhole power generator, sensors, microcontroller/microprocessor and a communications module, according to one or more example embodiments.

It should be noted, however, that in FIG. 1 a spherical shaped MMD is used as an example to illustrate how electricity can be generated using friction when the MMD is flowing with mud, but the shape of the device can be of any shape. In MMDs 600, 700 illustrated in FIGS. 1-2, the small spherical ball 204 and the rectangular bar 204 are enclosed in a tunnel 220 where they move or slide along a material deposited on the underside, on the plane 254 separating the two spheres when the MMD 600, 700 travels with the mud flow. The material that the ball 204 and the bar 204 are made of, material A, and the material 206 on the underside, material B, are of opposite polarities. When they contact, charges move from one material to the other. Some materials have a tendency to gain electrons and some to lose electrons. If material A has a higher polarity than material B, then electrons are injected from material B into material A. This results in oppositely charged surfaces. When these two materials are separated there is current flow, when a load is connected between the materials, due to the imbalance in charges between the two materials. The current flow continues until both the materials are at the same potential. When the materials move towards each other again there is a current flow again, but in the opposite direction. Therefore, this contact and separation motion of materials can be used to generate electricity. The electrodes 222 facilitate current flow to the bridge rectifier 106 where the generated electrical energy is converted from an alternating current to a direct current by the rectifier circuit employing diodes. The generated electricity can be stored so that it can be used as a regulated power source even when there is insufficient vibration or mud flow. The storage unit 108 can be either a di-electric capacitor for use at high temperatures, a ceramic, an electrolytic or a super capacitor. By storing the energy in a capacitor, power can be provided continuously to the sensors 118 and the communication module 114.

The storage unit provides power to the microprocessor/microcontroller unit, which performs the power management and control functions of the system. The microcontroller is connected to a transceiver and an antenna. The transceiver employs low power wireless technologies such as low-power Wi-Fi, Bluetooth, Bluetooth Low Energy, ZigBee, etc. The antennas can be directional, omni-directional and point-to-point. They can also be planar antennas such as monopole, dipole, inverted, ring, spiral, meander and patch antennas.

Figure 3:
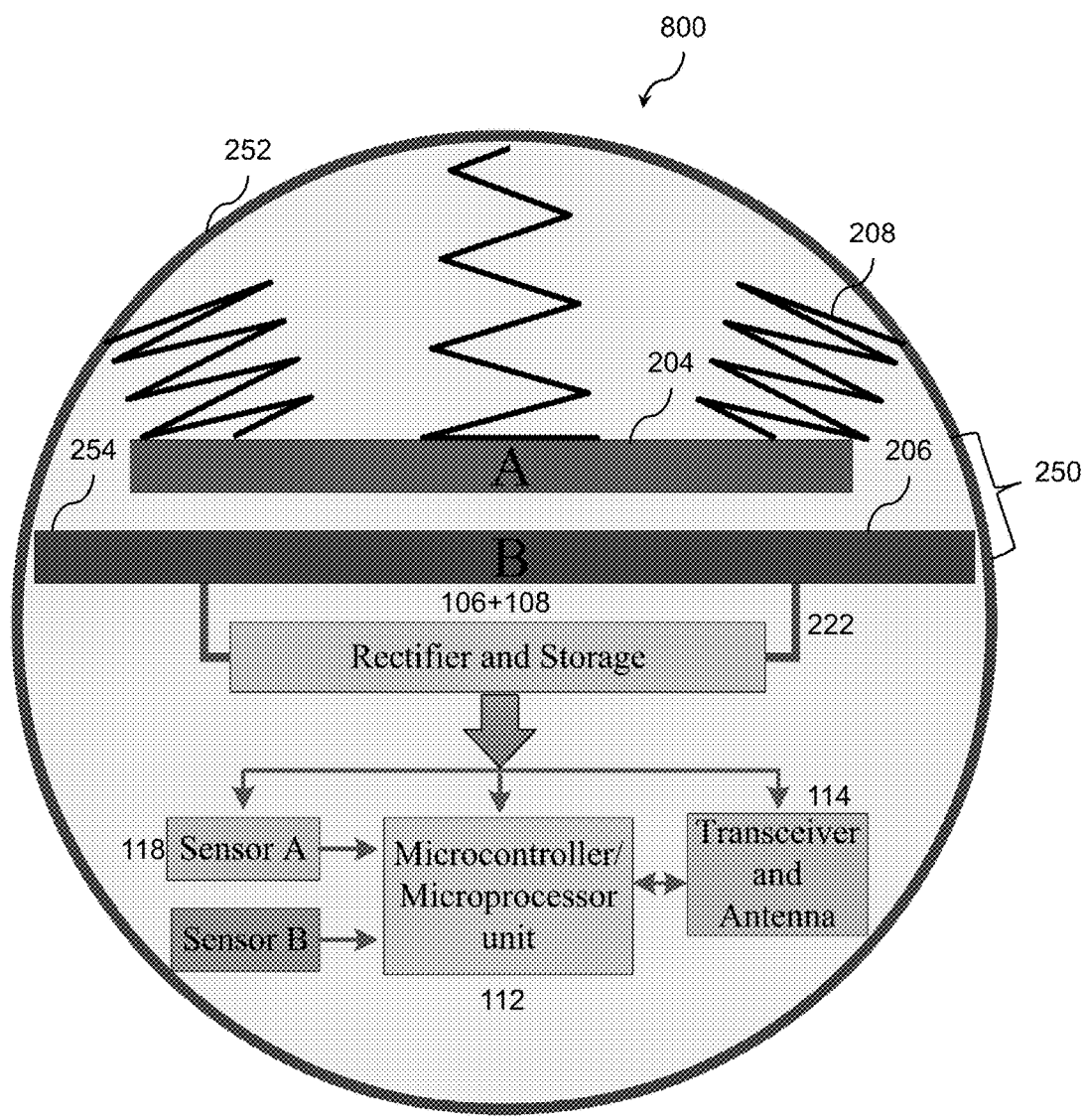
FIG. 3 is a schematic of a high temperature downhole miniature mobile device comprising a high temperature downhole power generator, sensors, microcontroller/microprocessor and a communications module, according to one or more example embodiments.

In FIG. 3, a rectangular plate 204, made from material A is attached to springs 208 and another material 206, material B, is fixed below it. When the MMD 800 travels with the mud it experiences vibrations and material A will contact and separate from material B thus, generating electricity. The electrical signal is changed from an alternating current to a digital current with the aid of a bridge rectifier 106 and the charge can be stored in a capacitor 108. Storage is important because otherwise the charge may be consumed as soon as it is harvested.

The power consumption must be minimized and therefore, should be carefully controlled. The microprocessor/microcontroller unit 112 performs the power management in the MMD 600, 700, 800. It interprets and processes information stored in the memory and analyzes the data obtained from the sensors 118. The sensors 118, memory and the transceivers and antenna in the communication module 114 have its own level of power usage. The sensors 118 only require power when it has to sense data from the environment and store it in memory. It has low or no power consumption after this process and can go to 'sleep' until it has to obtain data again. If the sensor 118 is required to continuously obtain data it has to be 'active' continuously and the microcontroller/microprocessor 112 is required to obtain data at a high sample rate. Since this will rapidly drain power from the storage the sensors 118 are designed to be 'active' at certain periods of non-overlapping times. Sensors 118 can also be designed to be 'active' at certain depths, where depth can be measured by an accelerometer, magnetometer or a gyroscope. Similarly, the transceivers 114 are designed to transmit and receive data at pre-determined times or when triggered by an external signal. Moreover, since transceivers 114 require more energy than sensors 118 and the microcontroller/microprocessor unit 112 to transmit/receive data, only a sample of data after analysis by the microcontroller/microprocessor, rather than all the sensed data, could be transmitted/received to save power downhole. The antenna can be on-chip or detachable and is integrated with the transceiver to form a communication module 114. The transceiver 114 employs low power wireless technologies such as low-power Wi-Fi, Wi-Fi Direct, Bluetooth, Bluetooth Low Energy, ZigBee, etc. Higher frequencies allow a better signal and a longer transmission distance. However, the system must be optimized since attenuation and power requirements are also higher at higher frequencies. The antennas can also be directional, omni-directional and point-to-point. They can also be planar antennas such as monopole, dipole, inverted, ring, spiral, meander and patch antennas. RFID tags can also be incorporated into each MMD 600, 700, 800 so that data obtained at the surface can be uniquely identified and linked to the correct MMD. Passive RFID tags do not require a power source but have low bandwidth and high failure rates in data transmission. Active tags can be used instead since each MMD has a power generator.

Multi-channel modules can be designed to optimize the space available in a MMD. For example, high temperature co-fired ceramic (HTCC) substrates of Alumina can used for the electronic boards. These substrates are generally plated with Cu, Ni and Au for soldering and wire-bonding. The circuit dies in these boards can be processed independently and assembled into a single device as a final step. The circuit boards can be interconnected with each other using ceramic single inline package headers on brazed pins (BeNi contacts). BeNi is commercially available and is a standard technology for high temperature packaging. HTCC packages have excellent mechanical rigidity, thermal dissipation and hermeticity, important features in harsh, high temperature applications. Silicon-on-insulator (SOI) technology can be utilized for active electronics in the system. Compared to bulk Si technology, SOI significantly reduces leakage currents and variations in device parameters, improves carrier mobility, electromigration between interconnects and dielectric breakdown strength. Silicon Carbide (SiC) based electronics has superior properties to silicon based electronics and is another candidate for harsh environment applications, which are thermally, mechanically and chemically aggressive. SiC has many polytypes but 6H and 4H (H=Hexagonal) are the two most commonly used polytypes. Silicon has a bandgap of 1.12 eV and loses its PN junction characteristics around 200-225° C. SiC on the other hand has a bandgap of greater than 3 eV and can tolerate temperatures up to 600° C. Compared with Si. SiC also has a higher melting point (1420° C. vs 2830° C.).

The system can have application-specific integrated circuits (ASICs), or field programmable gate array (FPGA) circuits. Compared to ASICs, FPGA circuits do not require layouts, masks or other manufacturing steps, has a simpler design cycle, a more predictable project cycle and field reprogrammability. FPGAs can be re-used and are cheaper than ASICs. ASICs require designs based on custom specifications. One of the main disadvantages of FPGAs is the high power consumption compared to ASICs. There is no control over power optimization in FPGAs whereas low power techniques can be used to optimize power consumption in ASICs. Static random access memory (SRAM) can be reprogrammed. Since the FPGA can be reprogrammed easily a design can be loaded into the part, tried at-speed in the system and debugged when required. This is ideal for board-level testing where the FPGA can be configured to verify the board or the components on the board. After the testing is finished the FPGA is reconfigured with the application logic. However, the main advantage of SRAM is also its main disadvantage since the IC loses its programming when the power is turned off. Therefore, SRAM based FPGAs must be reprogrammed each time power is applied so an external memory is needed for permanent storage of the program. This is not feasible when board space is at a premium like in downhole applications. Therefore, electrically erasable programmable read only memory (EEPROM) is a more feasible option when the MMD is used in downhole applications. EEPROM has slow write times but this is tolerable since the main code that is usually used at start up is only modified during development, then left alone. The EEPROM should have the capability to be configured as a serial interface. Serial interface are preferred over parallel interfaces to reduce the number of interconnections and reduce crosstalk.

Materials A and B in the power generator 250 are required to withstand high temperatures (>125° C.) and have good stability with little or no degradation in material properties after many cycles and they should not get damaged due to shock, vibration or high pressures. Some suitable materials are Copper, Aluminum, PTFE, Teflon, Kapton, Lead, Elastomer, PDMA, or any other material that can cause static electricity, or any material with similar or better thermal, mechanical and chemical properties for downhole environments, which can also be deposited as thin films. Also, the materials should be relatively cheap if they are to be used in power generators to generate electricity for many transceivers. When choosing materials it is important to remember that they have opposite polarities or polarities as distant as possible from each other. The shell 252 that the sensors are enclosed in must be robust enough to withstand the high temperature, high pressure corrosive and abrasive environments. Moreover, the shell 252 material should be able to preserve flexibility and elasticity to improve the energy conversion efficiency of the power generator. The shell 252 can be designed from a polymer material such as elastomer, which is already used in downhole tools, or any other material that has excellent heat conduction properties and a low Young's modulus. Packaging and encapsulation is mainly done to protect the MMD components from mud and other fluids in the formation, which may degrade its performance. However, it is important that the packaging and encapsulation does not in any way diminish the energies being harvested. The packaging and encapsulation should maintain or amplify the energies being harvested. In order to minimize vibrations in the sensors, electronics and the communication module they can be mounted and installed in ways to isolate vibrations. Chemical coatings can be used to further protect the MMD and its components from the harsh downhole environment. They can be polymeric coatings, which can be used to provide a uniform and pinhole free layer on sensor and electronic boards. These coatings can withstand continuous exposure to high temperatures for long periods of time, prevents corrosion of electrodes and is an excellent dielectric. Thermal insulation significantly extends the life and durability of the sensors and electronics. The outer protective shell 252 shields all the components inside from the environment and can be epoxy, resin-based materials, or any material that has good thermal conductivity properties.

Vibration and movement due to the flow of mud is absorbed by the MMD and this triggers the contact and separation between two materials of opposite polarities. The amount of vibration and movement depend on the flow speed of the mud, the size of the hole and the drill string assembly in the hole amongst other things. Using this principle, the MMDs illustrated in FIGS. 1-3 can be used for many downhole applications.

Figure 4:
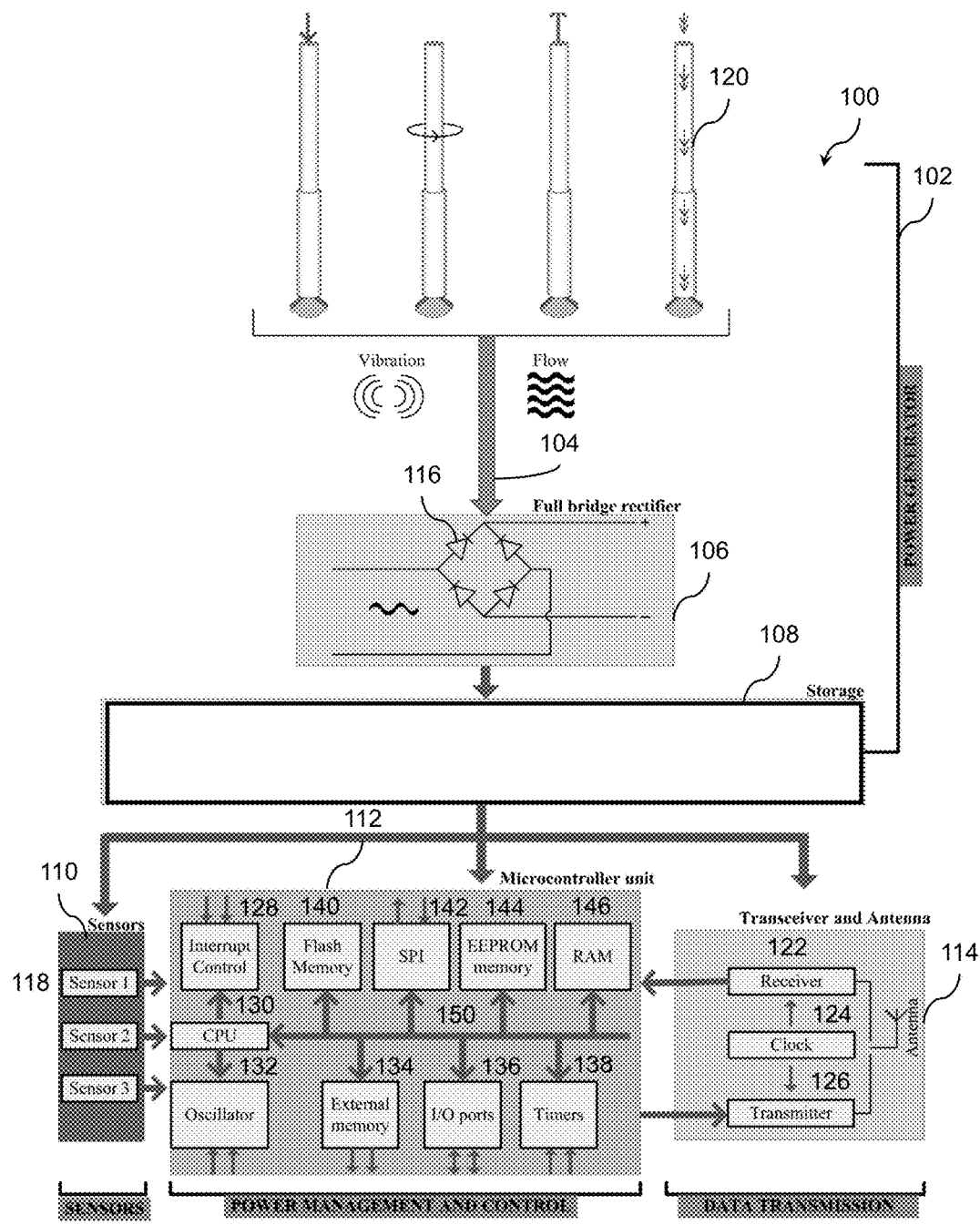
FIG. 4 is a block diagram illustrating a system for wirelessly monitoring well conditions including a high temperature downhole power generating device, according to one or more example embodiments.

Turning now to FIG. 4, is a block diagram illustrating a system for wirelessly monitoring well conditions, according to one or more example embodiments. Drill strings 120 are exposed to a variety of environments such as high temperature, pressure, torque, vibration and rotation during the drilling process. The drill string 120 experiences axial, lateral and torsional vibration for example, when it is drilling a formation, when it is being pulled out of a hole, when it is being run inside a hole and during a reaming trip. As FIG. 4 shows, the energy contained in these motions can be extracted for generating electricity.

One example embodiment is a high temperature power generating device 100 including a power generator 102. The power generator 102 can generate electricity by friction and can be utilized in a well to fully exploit the available downhole energy sources. Vibration can be triggered directly by mechanical motion and mud flow and in-directly with mud flow and the use of a mini-turbine, for example. Generating electricity by friction is based on the principle that an object becomes electrically charged after it contacts another material through friction. When they contact, charges move from one material to the other. Some materials have a tendency to gain electrons and some to lose electrons. If material A has a higher polarity than material B, then electrons are injected from material B into material A. This results in oppositely charged surfaces. When these two materials are separated there is a current flow, when a load is connected between the materials, due to the imbalance in charges between the two materials. The current flow continues until both the materials are at the same potential. When the materials move towards each other again there will be a current flow but in the opposite direction. Therefore, this contact and separation motion of materials can be used to generate electricity. The surfaces can be modified to increase the friction between materials and to increase the surface charge density by fabricating structures such as nano-pillars, patterning and depositing nanoparticles. According to one example embodiment, material A and material B may be selected from the group consisting of Copper, Aluminum, Polytetrafluoroethylene (PTFE), Polyimide, Lead, Elastomer, Polydimethylacrylamide (PDMA), Nylon, Polyester, a fire-resistant material, or any other material that can cause static electricity.

The generated electrical energy first has to be changed from an alternating current to a direct current. This can be achieved by a bridge rectifier circuit 106 employing diodes 116 as shown in FIG. 4. The bridge rectifier may be connected to material A or material B using one or more electrodes 104. The downhole power generator 102 continues generating electricity as long as the contact and separation mechanism is in motion. A more feasible way to optimize this generated electricity is to store the electrical energy so that it can be used as a regulated power source even when there is insufficient vibration or mud flow. The storage unit 108 can be either a di-electric capacitor for use at high temperatures, a ceramic, an electrolytic or a super capacitor. By storing the energy in a capacitor, power can be provided continuously to the sensors, instrumentation and communication devices. Compared to batteries, capacitors are easier to integrate into a circuit, are generally cheaper, can be bought off the shelf and are easier to dispose. According to one example embodiment, the storage unit includes one of ceramic film capacitors, electrolytic capacitors, supercapacitors, double-layer capacitors, or pseudo-capacitors.

The storage unit 108 provides power to the microcontroller unit 112, which performs the power management and control functions of the power generating device 100. The microcontroller unit 112 may include one or more processors 130, which may be connected to a flash memory 140, external memory 134, interface(s) 142, EEPROM 144, RAM 146, input/output ports 136, and timers 138 using one or more buses 150. The one or more processors 130 may also be connected to an interrupt control 128, and an oscillator or accelerometer 132, such as a MEMS accelerometer, for example. The microcontroller type may be 8051, PCI, AVR or ARM, for example. The microcontroller 112 is connected to a transceiver and an antenna unit 114. The transceiver 114 employs low power wireless technologies such as low-power Wi-Fi, Wi-Fi Direct, Bluetooth, Bluetooth Low Energy (BLE), ZigBee, etc. Higher frequencies allow a better signal and a longer transmission distance. However, the power generating device 100 must be optimized since attenuation and power requirements are also higher at higher frequencies. The antennas 114 can be directional, omni-directional and point-to-point. They can also be planar antennas such as monopole, dipole, inverted, ring, spiral, meander and patch antennas. According to one example embodiment, the transceiver and an antenna unit 114 may include a transmitter 126, a receiver 122, a clock 124, and one or more antennas, for example.

The microcontroller unit 112 may be operatively coupled to a sensor unit 110, which may include one or more sensors 118. Sensors 118 may be used for MWD or LWD purposes, and may include a variety of sensors that perform MWD and LWD functions, as known to one of skill in the art.

Turning now to FIGS. 5-8, the example embodiments described herein provide for two main ways to capture the energy created by downhole vibrations. One that is due to mechanical motions such as rotation of the drill string 120, and the other due to hydraulic motions such as mud flow. The designs illustrated aim to optimize the mechanical and hydraulic triggering required to optimize the generation of electricity. It should be noted, however, that in FIGS. 5-8 the electrode 104, bridge rectifier 106, storage unit 108, and sensor unit 110 are not shown for simplicity purposes.

Figure 5:
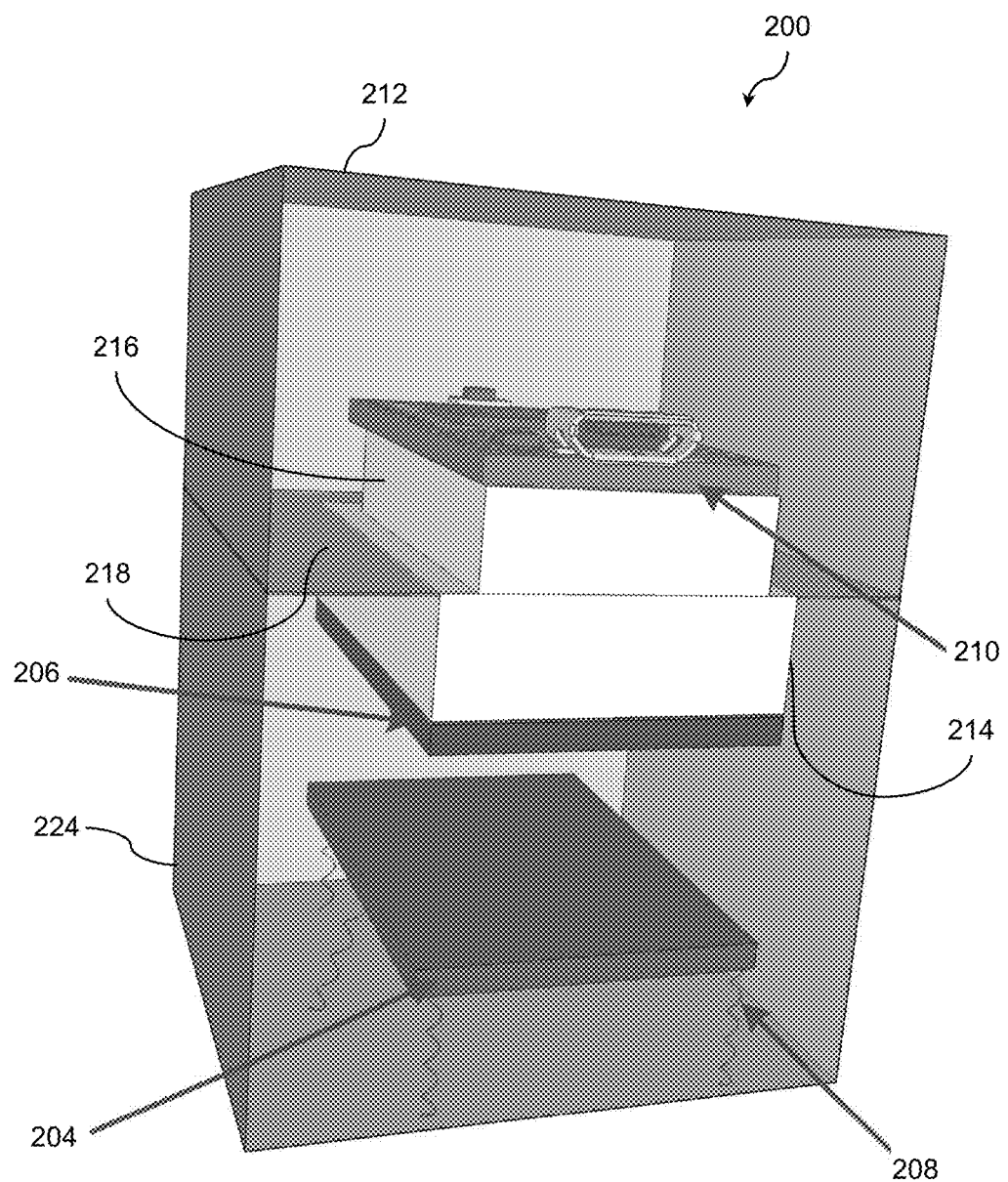
FIG. 5 is a schematic of a high temperature downhole power generating device, comprising a high temperature downhole power generator, as well as sensors and instrumentation, according to one or more example embodiments.
Figure 6:
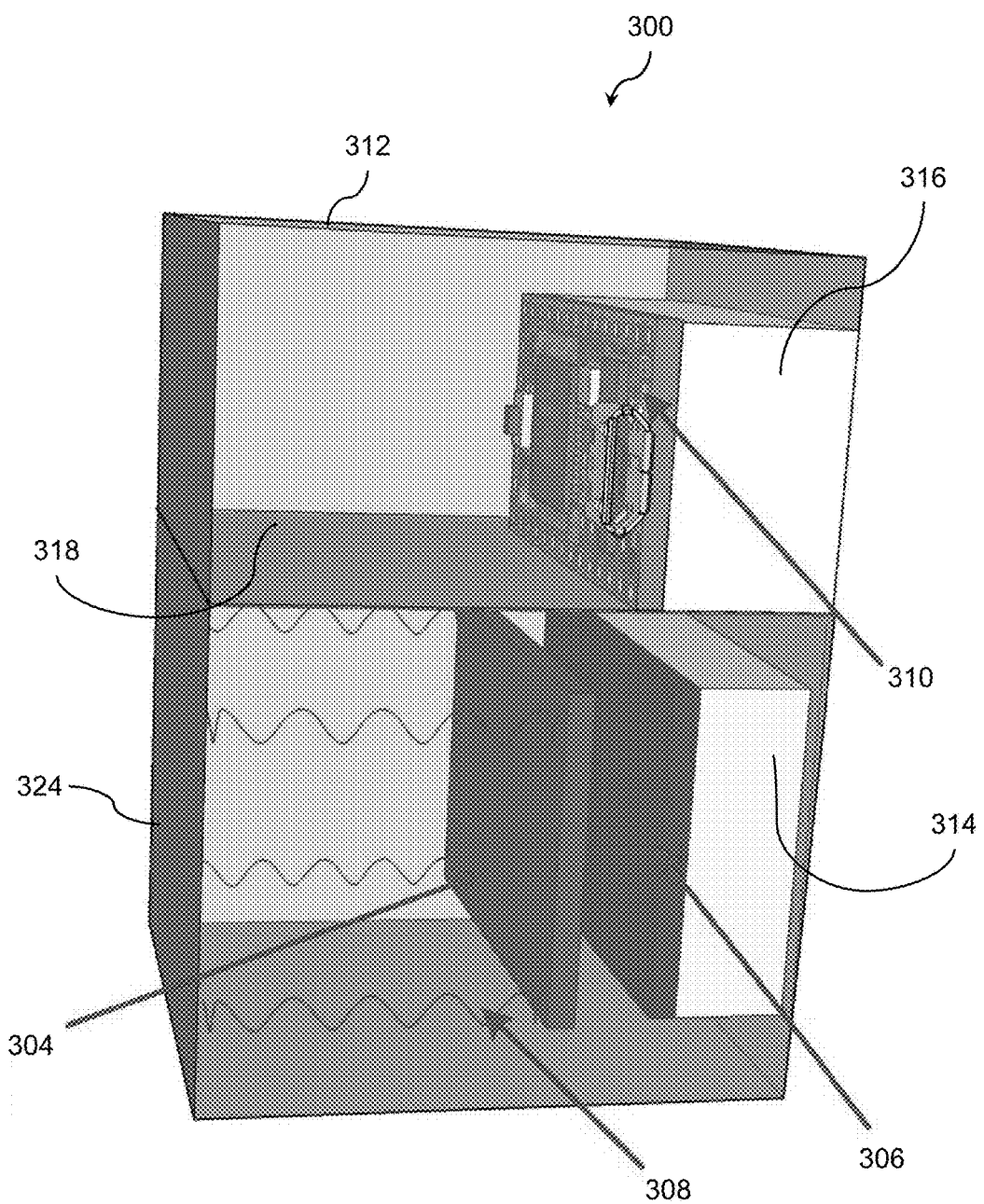
FIG. 6 is a schematic of a high temperature downhole power generating device, comprising a high temperature downhole power generator, as well as sensors and instrumentation according to one or more example embodiments.

High temperature power generating devices 200, 300, as illustrated in FIGS. 5, 6, for example, utilize springs 208, 308 to propel a material 204, 304 (material A) attached to the springs 208, 308 towards another different material 206, 306 (material B), which is opposite in polarity to material A and is fixed, when there is vibration due to rotation and/or mud flow and/or noise. The stiffness of the springs 208, 308 is optimized to maximize the contact and separation motion and can be any size and shape to move and constrain material A only in the direction of material B. The springs 208, 308 are designed in such a way to minimize motion retardation and experience compression and extension at the same time. The springs 208, 308 also contribute to the momentum of material A contacting material B therefore, increasing the charge transfer between the two materials. Generally springs obey Hook's law and produce restorative forces directly proportional to their displacement. They store mechanical energy in the form of potential energy and release it as the restorative force, resulting in a constant spring coefficient. Springs 208, 308 can also be tuned to produce restorative forces that are not proportional to their displacement. These springs are not governed by Hook's law so they can be made to provide restorative forces as required by the application. The springs 208, 308 that may be used can be compression, extension, torsion, Belville springs or any other system made from elastic materials.

As illustrated in FIGS. 5 and 6, material 206, 306 is fixed on a block 214 314, on the inner drillstring interface, which insulates the connection from the power generator to the MTU 210 310. Depending on the direction of the vibration, axial and/or lateral and/or torsional, material 204, 304 contacts the fixed material 206, 306 vertically and/or slide against it and then separate. This contact and separation mechanism generates electricity as it may be apparent to one of skill in the art. There are vibrations when the drill pipe is rotated, when running in hole, pulling out of hole, drilling or reaming as well due to the noise generated from these motions. Moreover, mud flow carries kinetic energy and the magnitude of this energy is related to the speed and duration of the mud flow, which can be controlled at the surface. When the mud flow contacts the housing where the power generator is located it captures the kinetic energy from the mud and transfer this kinetic energy into vibration. The vibration of the housing triggers the motion of the springs, which moves material 204, 304, attached to them, towards the other different material, material 206, 306, which is anchored and stationary, which results in contact first and then separation. This motion may continue as long as there is vibration.

In FIG. 5 material 204 is connected by springs 208 attached to the housing 224 324 424 524. The materials 204, 206 are rectangular in shape, but can be square, circular, triangular or any shape that maximizes the contact area, and they are positioned vertically to maximize the contact area due to lateral vibrations by contacting vertically but also to slide during axial and/or torsional vibration. In FIG. 6, materials 304, 306 are positioned horizontally to maximize the contact area due to axial vibration but also to slide during lateral and torsional vibration.

In FIGS. 5-8, the microcontroller and transceiver unit (MTU) 210, 310, 410, 510 is in a special housing 212 312 412 512 to minimize vibration and temperature either outside the drill string 120 and therefore, is different to the housing of the power generator 224, 324, 424, 524. The housing 212 312 412 512 may include a material selected from the group consisting of certain solids, transition metals, as well as high strength alloys and/or compounds of the transition metals, and high temperature dewars. According to one example embodiment, the microcontroller and transceiver unit (MTU) 210, 310, 410, 510 may be mounted on a block 216, 316, 416, 516, which may insulate the connection from the power generator portion to the MTU using a separator 218, 318, 418, 518. In order to minimize vibrations in the MTU 210, 310, 410, 510, mounts and valves can be installed to isolate vibrations, and materials such as Steel, Titanium, Silicon Carbide, Aluminum Silicon Carbide Inconel and Pyroflask, can be used to reduce the effect of high temperature. The material for the housing 224, 324, 424, 524 of the power generator on the other hand should be designed to preserve its flexibility and elasticity to maximize vibrations and hence, improve the energy conversion efficiency. However, it but must be optimized so that the building blocks of the power generator will not be damaged. Therefore, for optimization we use specific materials for the building blocks of the power generator as described below. The housing 224, 324, 424, 524 can be designed from a polymer material such as elastomer, which is already used in downhole tools, or any other material that has excellent heat conduction properties and a low Young's modulus. Packaging and housing is mainly done to protect the power generator from mud and other fluids in the formation, which may degrade its performance. However, it is important that the packaging and housing does not in any way influence the energies being harvested by reducing the vibration for example. The housing 224, 324, 424, 524 and packaging should maintain or amplify the energies being harvested.

Figure 7:
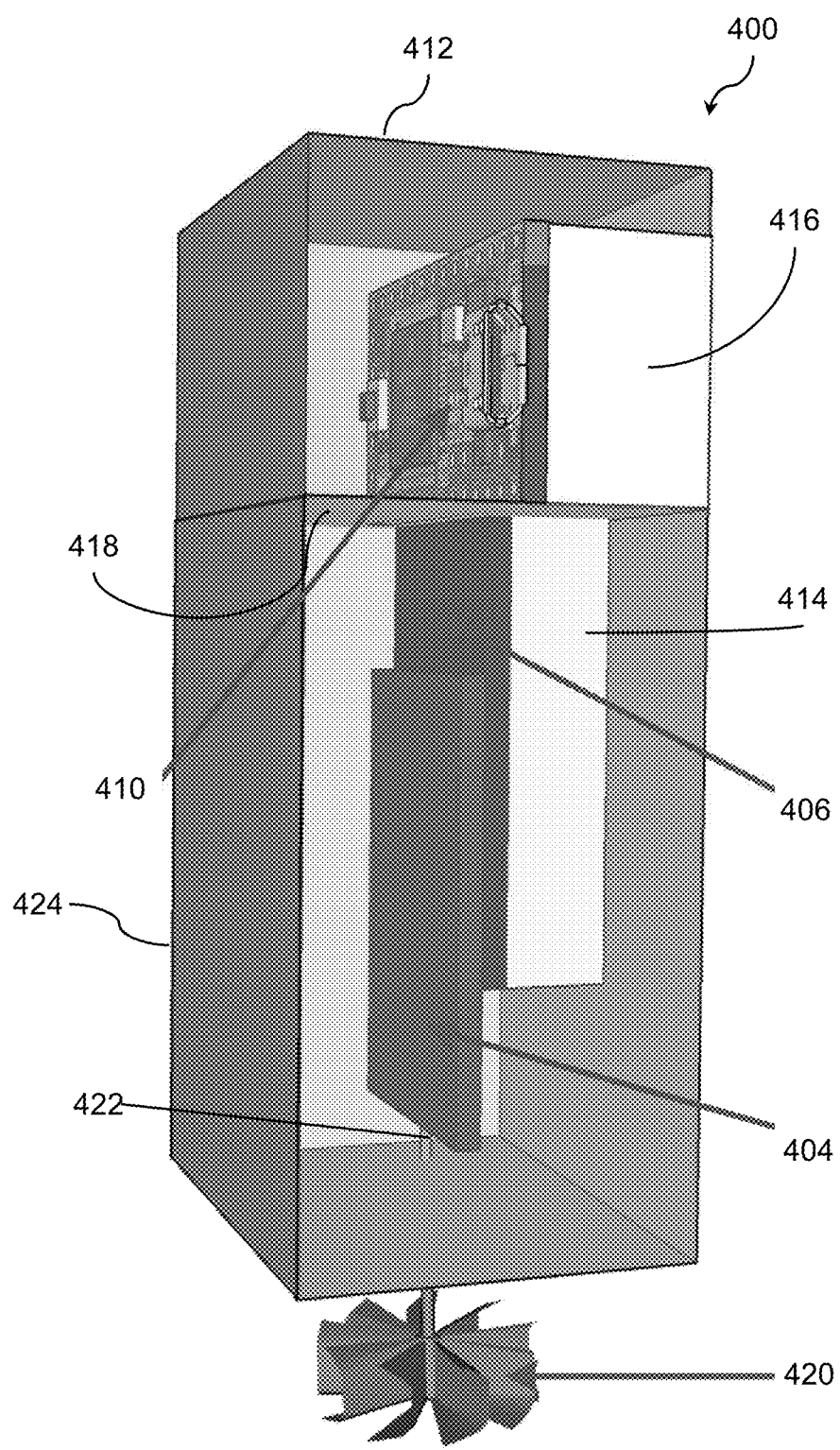
FIG. 7 is a schematic of a high temperature downhole power generating device, comprising a high temperature downhole power generator, as well as sensors and instrumentation according to one or more example embodiments.
Figure 8:
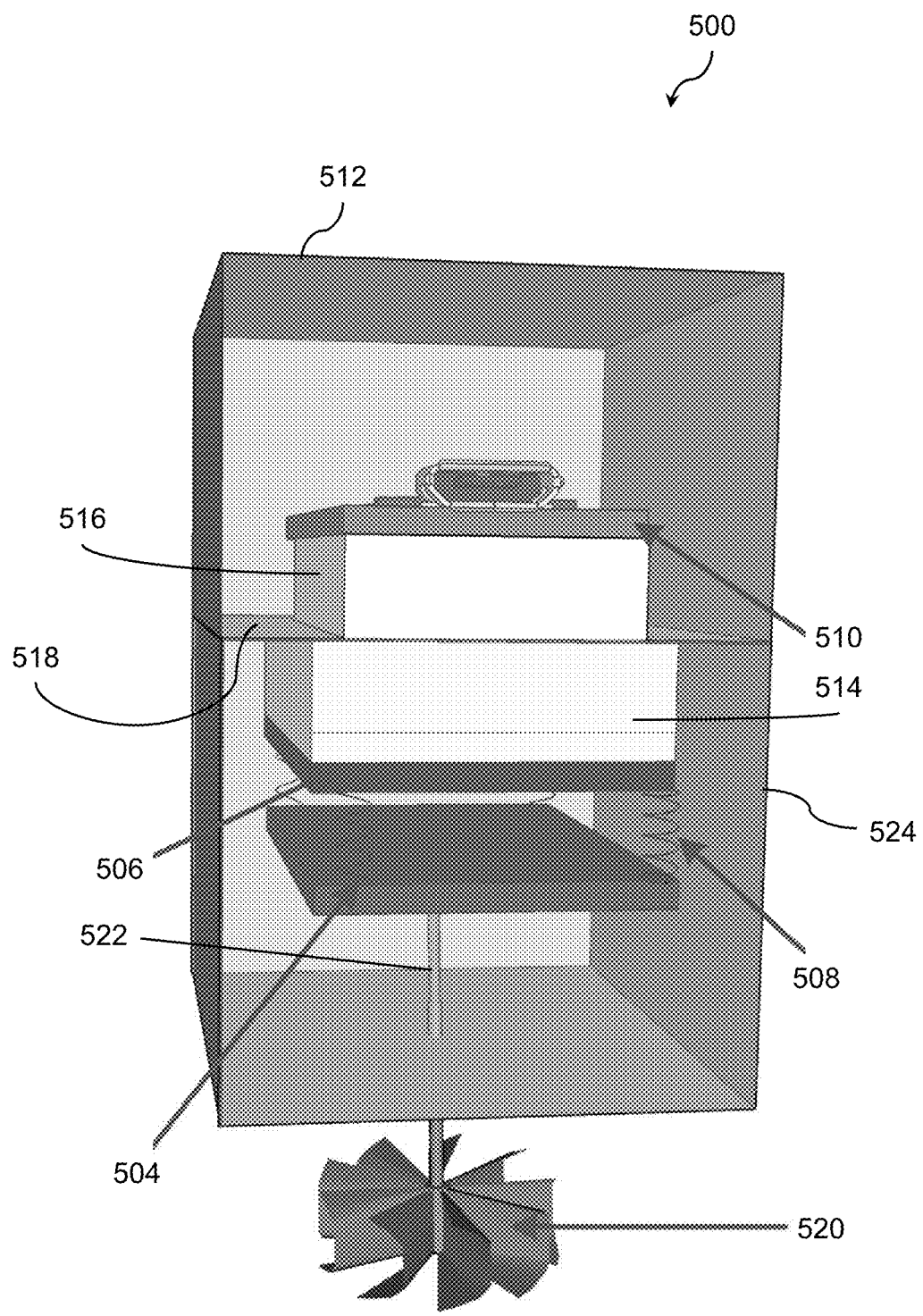
FIG. 8 is a schematic of a high temperature downhole power generating device, comprising a high temperature downhole power generator, as well as sensors and instrumentation according to one or more example embodiments.

Example embodiments of power generating devices 400, 500, illustrated in FIGS. 7 and 8, employ a mini-turbine or fan 420, 520 to capture the energy from mudflow and create friction between two materials, of opposite polarity, to generate electricity. The mini-turbine 420, 520 can be designed as a hydro turbine, pelton runner, etc. and is small enough to be integrated with the power generator and the MTU. The blades of the mini-turbine/fan 420, 520 are connected to the center shaft 422, 522. The kinetic energy of the mud flow in a drill string 120 rotates the blades of the mini-turbine/fan 420, 520. The mini-turbine or fan 420, 520 is connected to a shaft 422, 522 and the shaft 422, 522 is connected to material 404, 504. The shaft 422, 522 is used to generate linear motion or can be used with a crank/slider-crank, a dwell cam system or mechanical gears for example to push or slide material 404, 504 onto material 406, 506, which is opposite in polarity to material 404, 504 and is fixed and stationary, as shown in FIG. 7. The mini-turbine/fan 520 can also be used to push material 504 onto material 506, as shown in FIG. 8. Both these motions ensure the contact and separation of the materials to generate electricity. In mini-turbine/fan 420, 520 based systems the flow speed have to be optimized for maximum energy efficiency of the power generator.

The choice of materials depends on several factors. The most important is that the materials must be able to withstand high temperatures (>125° C.). Even though the MTU will be housed to minimize the effect of high temperature and pressure, it is important that the building blocks of the power generator has the ability to withstand high temperatures. This is because housing can only protect the components inside only up to a certain duration of time by conducting heat away from them according to its thermal coefficient of conduction. High durability is also an important consideration due to the repeated contact and release as well as sliding motions experienced by the materials. Materials must have good stability with little or no degradation in material properties after many cycles and they should not get damaged due to shock and vibrations. Some suitable materials are Copper, Aluminum, PTFE, Teflon, Kapton, Lead, Elastomer, PDMA, or any other material that can cause static electricity or any material with similar or better thermal, mechanical and chemical properties for downhole environments that can also be deposited as thin films. Also, the materials should be relatively cheap if they are to be used in power generators to generate electricity for many transceivers. When choosing materials it is important to remember that they have opposite polarities or polarities as distant as possible from each other. Suitable materials for housing were described before. The choice of materials for the mini-turbine, fan and for the contact and sliding materials are the same as mentioned above.

Figure 9:
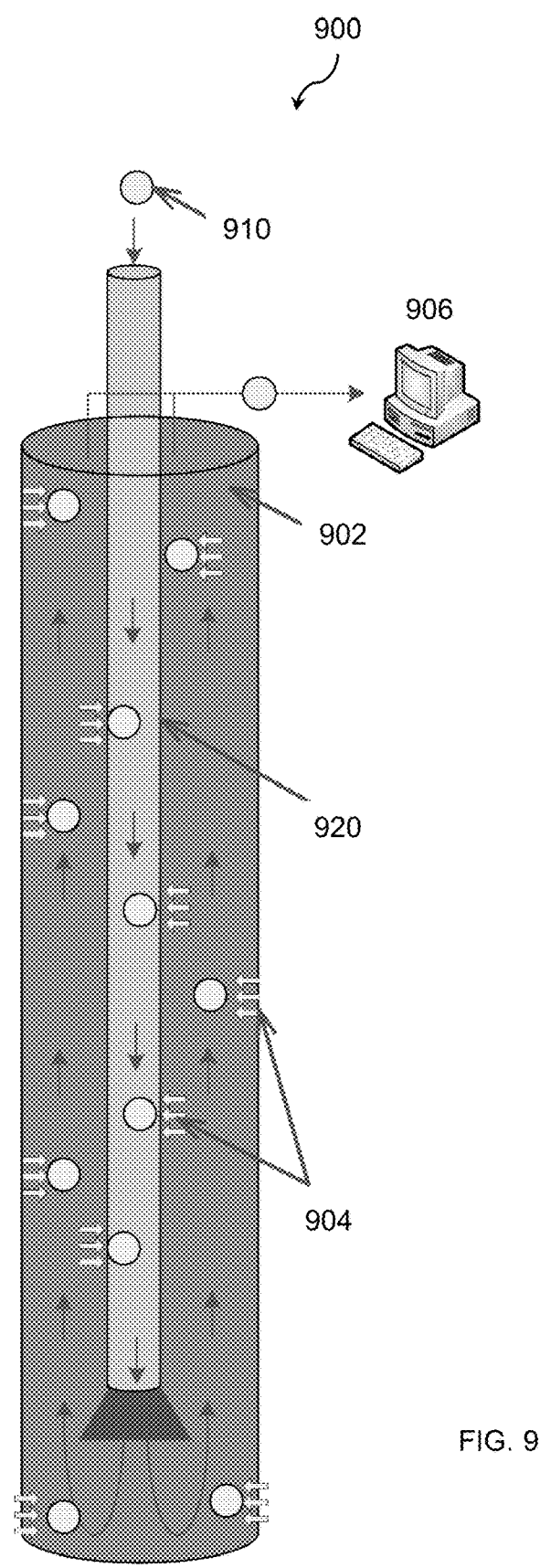
FIG. 9 is a schematic of a system for monitoring well conditions including a plurality of high temperature downhole miniature mobile devices, according to one or more example embodiments.

FIG. 9 illustrates a system 900 where a plurality of high temperature MMDs 910 are sent downhole through the drill string 920 by mud flow. They can be sent downhole with mud flow, travelling through the drill string 920 to the bottom of a well 902, and then up the annulus to a surface computer 906, to measure downhole parameters. The MMDs 910 have the possibility to get as close as possible to the geological formations to measure formation data 904 since they travel with the mud, a significant advantage compared to wireline logging and MWD/LWD tools, and provide a complete profile of the wellbore. Moreover, by sending several MMDs downhole high resolution/spatial data can be obtained all around the wellbore. The measured formation data 904 may be stored in memory and can be downloaded once the MMDs 910 reach the surface. On the surface, the memory device of the MMD 910 can be accessed wirelessly or through a port such as USB, I2C RS-232 etc.

Figure 10:
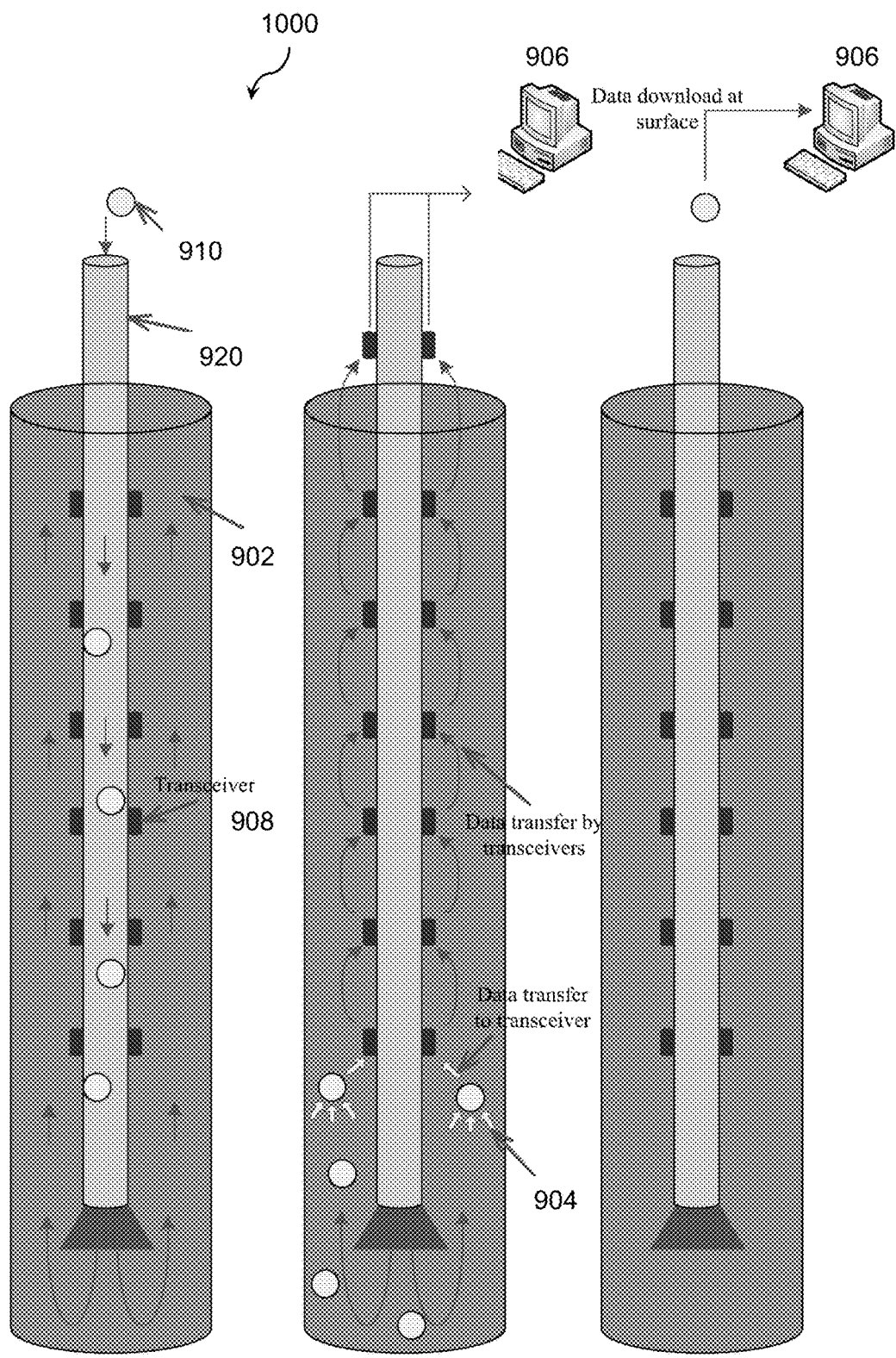
FIG. 10 is a schematic of a system for wirelessly monitoring well conditions including a plurality of high temperature downhole miniature mobile devices and a string of wireless transceivers, according to one or more example embodiments.

According to one example embodiment as illustrated in FIG. 10, MMDs 910 can also transmit downhole data to a set of transceivers 908 placed along a drillstring 920 in system 1000. The transceivers 908 transfer the data 904 from one to another, as in a relay, to the surface computer 906. Therefore, any data 904 received by repeaters/readers/transceivers from a MMD 910 can be immediately transmitted to the surface computer 906 and gradients of important wellbore parameters such as pressure and temperature can be immediately established at the surface. To this effect, the transceivers along the drillstring act as a dedicated high speed communication channel. This is one of the main advantages of the system proposed system as the real-time/near real-time access to bottomhole data is of utmost importance to the driller to conduct a safe and efficient drilling operation. This information can also be confirmed once the MMD 910 is recovered at the surface and data is downloaded from its memory. Another main advantage of the MMDs and the transceivers is that they are self-powered and therefore, can stay in the hole as long there is mechanical/hydraulic energies in the hole.

Figure 11:
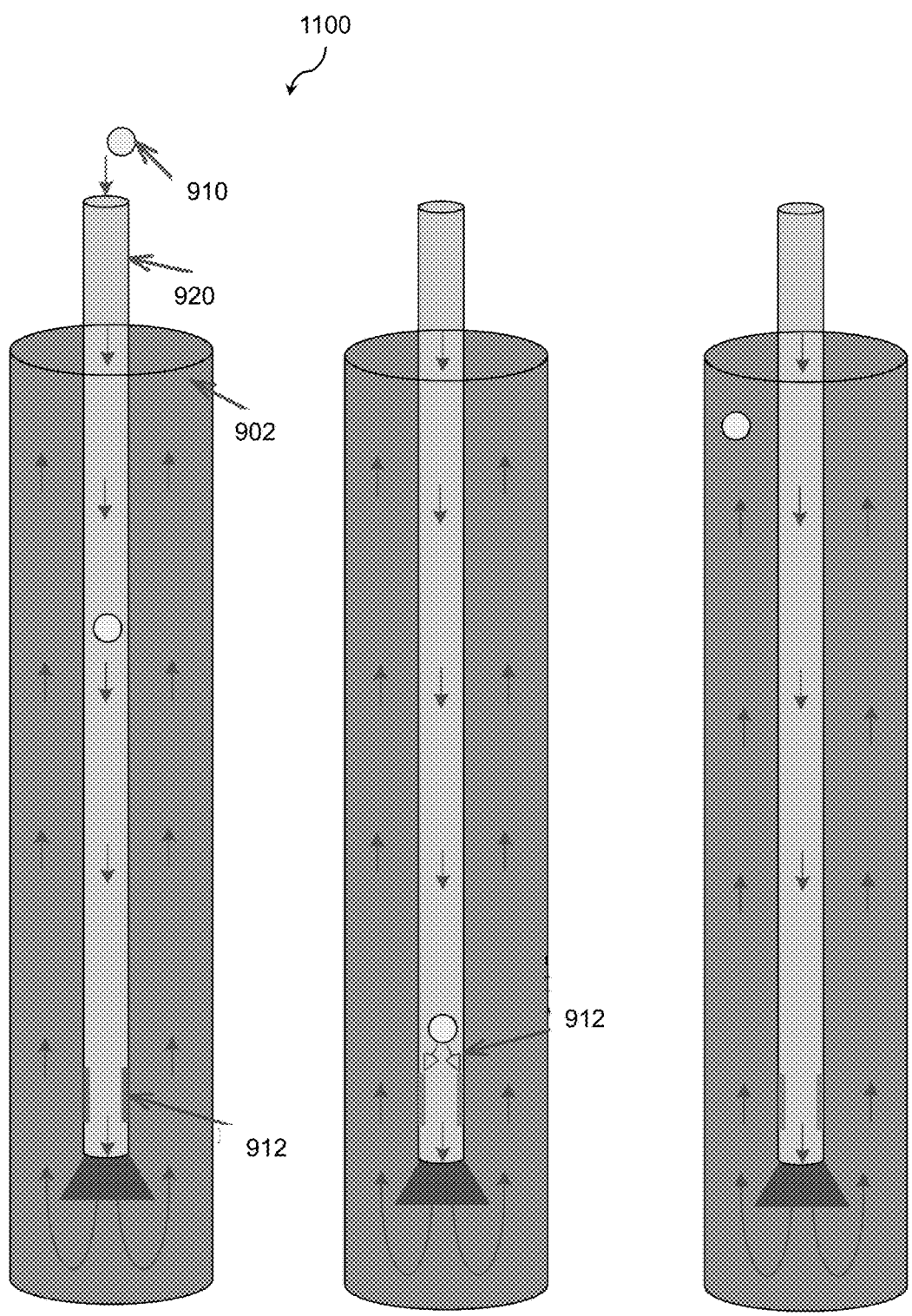
FIG. 11 is a schematic of a system including a plurality of high temperature downhole miniature mobile devices, for activating, deactivating or configuring a downhole tool or using a downhole tool for activating, deactivating or configuring high temperature downhole miniature mobile devices, according to one or more example embodiments.

To access a downhole tool 912, especially a tool in a hard to reach area, the drillstring 920 has to be pulled out of the hole, which is a time consuming and a costly procedure. Instead, a MMD 910 can also be injected into a well 902 to access a downhole tool 912 as illustrated in the system 1100 in FIG. 11. Here, a MMD 910 can be deployed to travel to the vicinity of the downhole tool 912 and switch a downhole tool 912 from 'sleep' to 'active' mode or change the operation mode from configuration A to B, for example. Moreover, a MMD 910 can also be used to download data from a downhole tool 912, which can be downloaded and analyzed once the MMD 910 reaches the surface. A batch of MMDs 910 can be injected downhole to perform the same procedure to confirm the downhole tool 912 is activated. A unique feature of the system is that an MMD does not necessarily have to reach a bottomhole tool to activate/configure it. A signal can be simply sent along the transceiver channel to the bottomhole tool to activate/configure it. If the activation/configuration depends on the values of certain wellbore parameters at a certain depth, then the mobile device can flow to this depth, measure these parameters and send a signal based on the result to the downhole tool via the transceiver channel. The downhole tool can also be used for activating, deactivating, or configuring the high temperature miniature mobile device when the device is within a predetermined distance from the tool.

Figure 12:
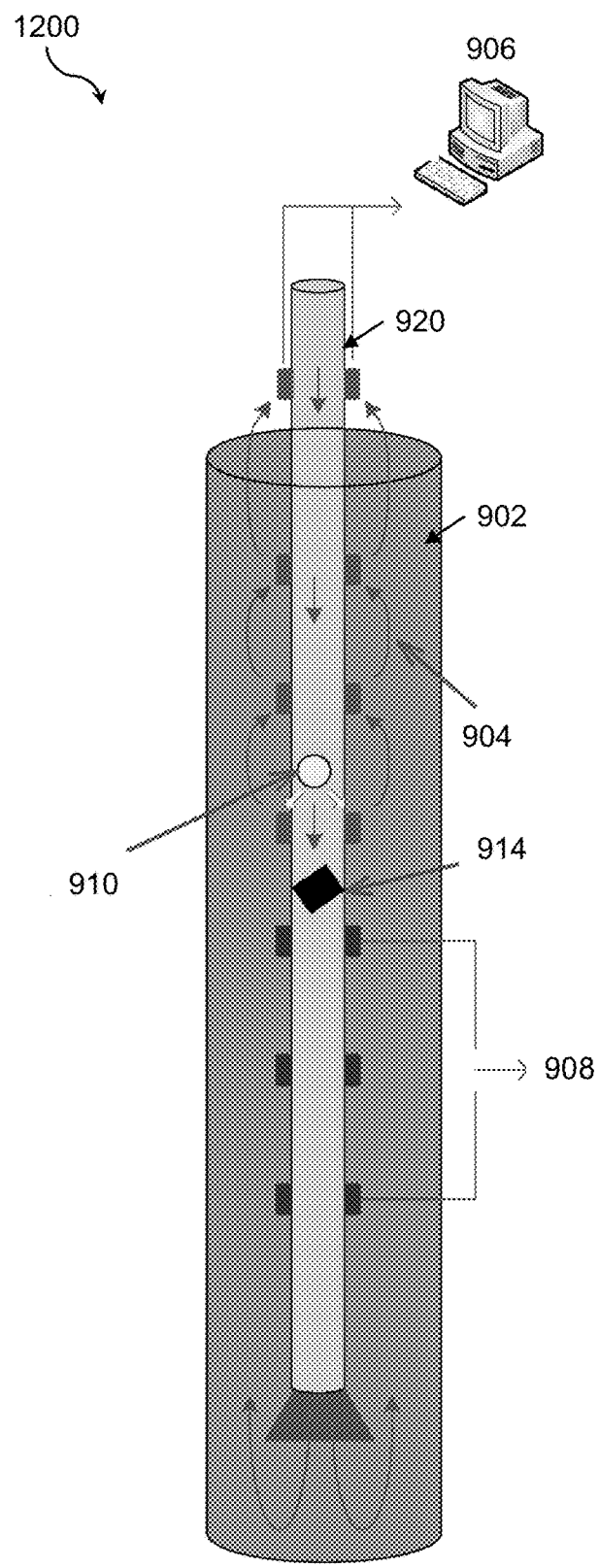
FIG. 12 is a schematic of a system for wirelessly monitoring well conditions including a plurality of high temperature downhole miniature mobile devices and a string of wireless transceivers, according to one or more example embodiments.

Another application of a MMD 910 can be to accurately locate the position of a dropped object 914 and/or an object obstructing the drillstring 920, as illustrated in the system 1200 shown in FIG. 12. The MMD 910 can be programmed to communicate with transceivers 908 placed along a drillstring 920, as described in the earlier embodiments. Each time a MMD 910 travels past a transceiver 908, the transceiver 908 sends a signal to the surface computer 906 confirming the location of the MMD 910. However, if there is an object 914 obstructing the path of the MMD 910 then the obstruction 914 can be identified by the motion sensor of the MMD 910.

Figure 13:
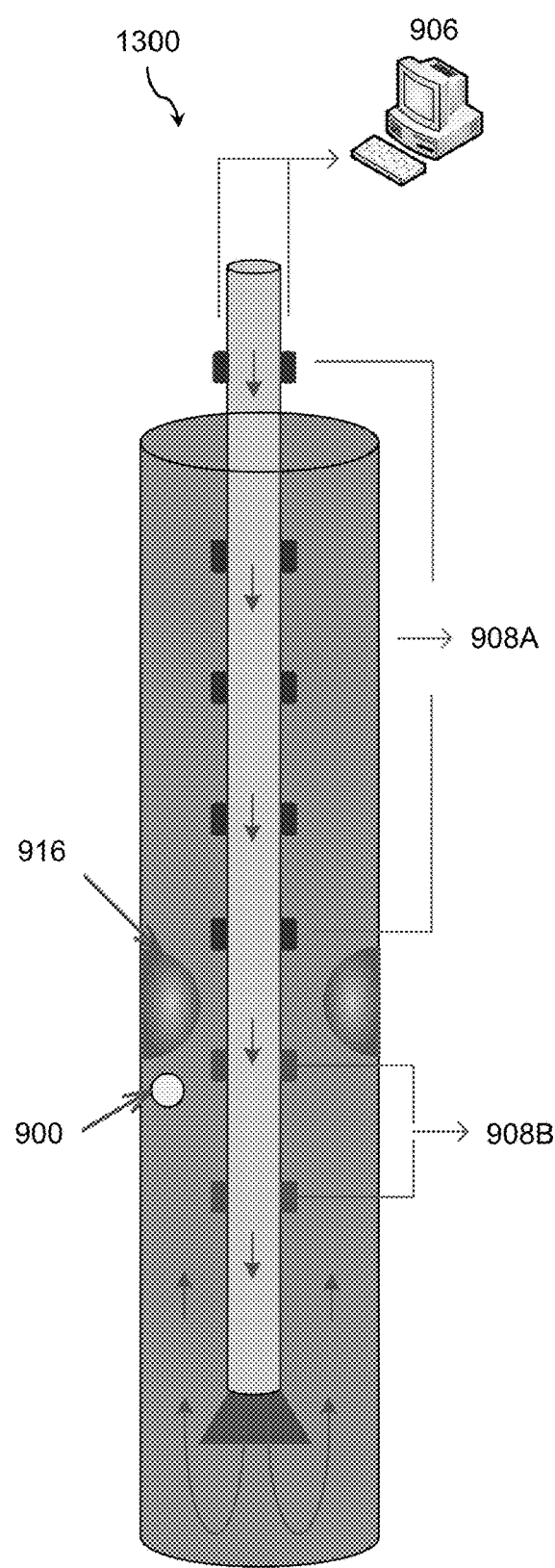
FIG. 13 is a schematic of a system for wirelessly monitoring well conditions including a plurality of high temperature downhole miniature mobile devices and a string of wireless transceivers, according to one or more example embodiments.
Figure 14:
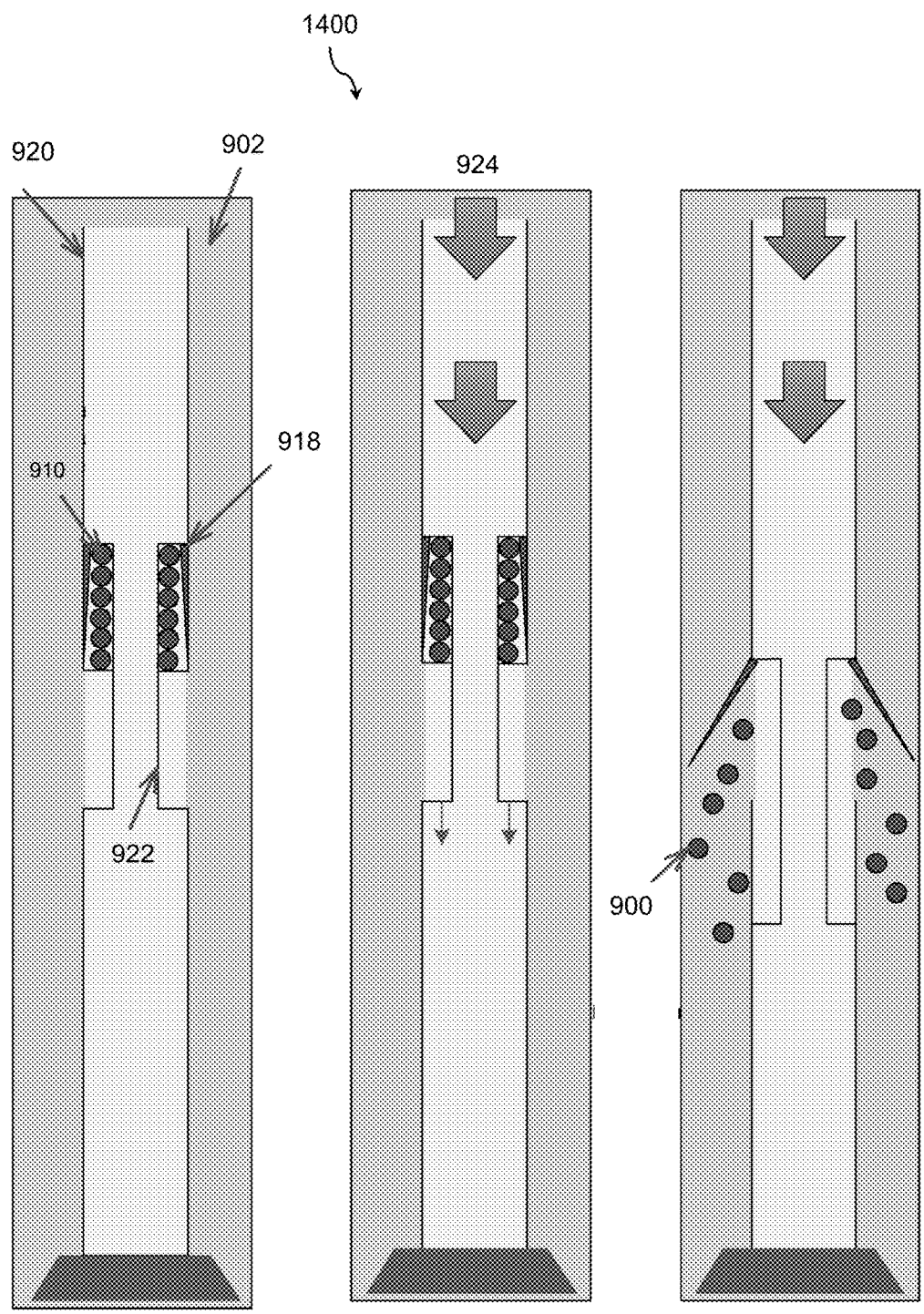
FIG. 14 is a schematic of a system for wirelessly monitoring well conditions including a plurality of high temperature downhole miniature mobile devices stored inside a sleeve on a drillstring, according to one or more example embodiments.

Similarly, as illustrated in the system 1300 shown in FIG. 13, if there are areas 916 where cuttings are accumulated in the annulus, the MMD 910 may fail to pass through these cuttings or will take a longer time to travel, which will be reflected in the time taken for the transceivers 908 to transmit a signal indicating the MMD 910 has passed its location. In some instances, transceivers 908B may receive the formation data 904 while transceivers 908A may not, or vice versa. The MMD 910 does not necessarily have to be injected into the well 902 from the surface nor do they always have to go through the drill string 920 into the formation. As illustrated in the system 1400 shown in FIG. 14, for example, the MMDs 910 can be placed in a sleeve 922 inside a drill pipe 920 and the sleeve 922 can be moved by applying mechanical/hydraulic pressure 924 to release the MMDs 910 into the formation 902. Sleeve 922 may be formed on an outer surface of the drill string 920, and the sleeve 922 may be adapted to move downwards in response to hydraulic or mechanical pressure. The sleeve 922 may include an outer valve 918 for securing the plurality of high temperature miniature mobile devices 910 in the body of the sleeve 922 and releasing the plurality of high temperature miniature mobile devices when opened. This can be useful if the MMDs 910 are only required to obtain information in a small interval in the formation 902, which may or may include the bottom of the well, or access a downhole tool 912 in a specific location. If the interval includes the bottom of the well, then the mud flow can be reverse-circulated and the MMDs 910 can go through the drill string 920 to reach the surface. Otherwise, the mud flow can itself move the MMDs 910 up the annulus to the surface.

Each transceiver 908 may be connected to its own power generator, which is triggered by mechanical/hydraulic motions in a downhole drilling environment. The distance between these transceivers 908 are dependent on the wireless communication technologies used, the power provided by the power generators, the downhole environment and the power management circuit of the microcontroller units. The transceiver array 908 transmits data, from one transceiver to another as in a relay, from the bottom of the well to the surface.

Prior to data transfer from the transceiver T1 to the next transceiver in the array, where T1 is at/near the bottom of the well and the last transceiver (TN) is at the surface or near the surface, a low data rate 'acknowledge' signal is sent from T0 to T1. This switches T1 from 'sleep' mode to 'stand by' mode' and to finally 'active' mode. T0 switches to 'stand by' mode since it is expecting a signal back from the first transceiver. If T0 switches to 'sleep' mode instead it will take more power to switch it back to 'active' mode. Once the 'acknowledge' signal is received at T1 it sends a 'ready' signal to T0. The T0 then transmits the first data stream, from sensor A for example, to T1. Once the data is transmitted, the central processor shuts down its power to the transceiver for an amount of time determined by how long it takes for the data to be relayed along the transceiver array to the surface. The central processor can wait until the data reaches the surface or until it reaches half the distance along the drill string or any other pre-determined time before it sends an acknowledge signal again to the first transceiver to transmit the next data stream, from sensor B, for example. This has to be optimized according to the downhole environment the drill string is exposed to, such as the mud type and geological formations, which can affect the data transmission rate.

Once T1 receives data from T0 it stores it in memory and then sends a signal to T3, located a distance 'x' away from T1, to check if it is ready to receive data. The distance 'x' is the maximum distance a signal can be transmitted between two transceivers. If T3 is ready it sends a signal back saying it is ready as explained before. Then the first transceiver transmits data to T3. T3 then performs the same functions as T1 starting by sending a signal to T5. In the event T1 does not get a signal back from T3, T1 sends another signal again to confirm. If there is still no signal T1 sends a signal to T2, where the transmission distance is x/2; x/2 is half the maximum distance a signal can be transmitted between two transceivers. If there is a confirmation signal back from T2 then T1 transmits the data to T2. T2 then performs the same process T1 performed, transfer data to T4, in order to transfer the data up the drill string, all the way to the surface. Another method of data transmission is for T1 to send a signal to T2, located a distance x/2 away from T1, to check if it is ready to receive data. If T2 is ready it sends a signal back saying it is ready as explained before. Then the first transceiver transmits data to T2. In the event T1 does not get a signal back from T2, T1 sends another signal again to confirm. If there is still no signal T1 sends a signal to T3, where the transmission distance is x; x is the maximum distance a signal can be transmitted between two transceivers. If there is a confirmation signal back from T3 then T1 transmits the data to T3. T3 then performs the same process T1 performed in order to transfer the data up the drill string, all the way to the surface. This way the communication link from downhole to the surface can be kept active even in the event one transceiver in the array along the drill string may cease to function. This method is based on the assumption that it is very unlikely two immediate transceivers would fail and cease to function. If the need arises to increase the number of transceivers a given transceiver can transmit to from 2 to N, then the maximum distance a signal can be transmitted between two transceivers can be divided by N; the distance between two immediate transceivers on the drill string will then be x/N.

Data obtained by the MWD or LWD might not stay constant and may change over time due to drilling and other process performed inside a wellbore. For example, temperature and pressure data measured by MWD/LWD sensors at certain depths along a wellbore may change over time. Therefore, the driller cannot obtain real-time information of these parameters at these depths unless he runs the MWD/LWD sensors at these depths again, which is very costly and not a feasible operation. An example of an advantage in having real time well data is in the real-time evaluation of kicks in wells. Drilling in deep reservoirs with partial/severe loss circulation is tremendously expensive since the driller is drilling 'blind' as there is no real-time data on where the mud is being lost to the formation. Therefore, it is impossible to know the amount and the density of mud that needs to be added into the drill string and the annular to keep drilling and ensuring that kicks don't travel to the surface.

One solution is to have a smart drill pipe 920 with one or more sensors 118 coupled to each transceiver 908. These sensors 118 can be commercially available sensors such as pressure, temperature and vibration sensors. Sensors 118 can be integrated with the microcontroller units as long as electricity generated by the power generators is sufficient to power the sensors 118 and the transceivers 908. This is achievable since the sensors and the transceivers do not operate simultaneously. Once a tool stops its operation it can shut down and go to sleep to reduce power usage and the instructions to do so are handled by the microcontroller unit. The smart drill pipe 920 gives real time distributed sensing data, which can be used to effectively monitor the well and respond immediately if there is a problem. The number and type of sensors in a communication module depend on the availability of power at each communication module. The alternator/turbine of the MWD can also be replaced with a power hub that provides electrical power to downhole sensors by friction between two materials. The power hub may be a single unit designed to utilize one or more of the downhole energies described before or a connection of smaller units for increased power. It will be significantly smaller than the turbine/alternator and/or battery arrangement thereby freeing up a lot of space in the drill string and can significantly reduce the cost of logging and surveying tools. It does not employ magnets and coils so there is no need for expensive drill collars, it doesn't depend solely on mud flow to generate electricity so doesn't need a large battery as a backup.

Therefore, the example embodiments described above relate to a novel high temperature (>125° C.), self-powered MMD that can be sent downhole with mud flow, to activate downhole tools and/or measure downhole parameters such as pressure and temperature, which could then transmit this information to communication modules when travelling up the annulus to the surface. Any data obtained by transceivers can be immediately transmitted to the surface by the telemetry method described before. The high transmission rate is also no affected by in-situ mud types.

The example embodiments disclosed provide downhole power generation sufficient to supply required power source to power each data relay device along the drillstring to achieve a much high data transmission rate, that is also not affected by in-situ mud types. It is therefore designed to be a self-powered telemetry system, particularly suitable for extra high temperature (>125° C.) environments.

Example embodiments relate to a high temperature, self-powered, downhole communications system (HTSP-DCS) to increase the speed and enhance the reliability of data transmission between the bottom of the drill string and the surface in high temperature wellbores. Increasing the speed of data transmission allows the accurate characterization of the formation being drilled and the downhole environment so that the target reservoir can be reached according to plan. Moreover, the smart drill pipe concept, where real time distributed sensing data can be obtained from the surface to the bottom of hole, enables the real-time detection of kicks in deep reservoirs with partial/severe loss zones leading to precise control of the well.

The downhole power generator described in the above example embodiments is designed to generate electricity by using friction between two materials of opposite polarities. With the aid of unique apparatuses we describe how to fully exploit the mechanical/hydraulic energies usually encountered in a drilling environment, such as vibration and mud flow, to generate friction between two materials. However, the design of such a generator must be carefully designed and optimized when utilized in a well to fully exploit the available downhole energy sources without causing interference with exploration and production activities. Vibration can be triggered directly by mechanical motion and mud flow and in-directly with the aid of mud flow and a mini-turbine. Generating electricity by friction is based on the principle that an object becomes electrically charged after it contacts another material through friction. When they contact, charges move from one material to the other. Some materials have a tendency to gain electrons and some to lose electrons. If material A has a higher polarity than material B, then electrons are injected from material B into material A. This results in oppositely charged surfaces. When these two materials are separated there is current flow, when a load is connected between the materials, due to the imbalance in charges between the two materials. The current flow continues until both the materials are at the same potential. When the materials move towards each other again there is a current flow again, but in the opposite direction. Therefore, this contact and separation motion of materials can be used to generate electricity. Moreover, the materials used to build the power source such as Aluminum, Copper, Kapton, PTFE, PDMA, or any other material that can cause static electricity and can work at high temperatures (>125° C.).

Systems described in the above example embodiments include wireless communication technology as a data transmission method. Data transmission data rates up to a million times faster than mud pulse telemetry (bits per second to megabits per second) can be achieved by coupling wireless communication technology with transceivers placed at specific locations in the drill string to transmit data from the MWD and LWD tools to the surface. Increased data transmission rates provides significant advantages in a drilling environment such as the opportunity to immediately respond to well control problems and revise mud programs. The mud pulse telemetry system is replaced by an array of transceivers placed at specific locations on the drill pipe, from the bottom of the well to the surface. Each transceiver is connected to the power generator mentioned above and is triggered by mechanical/hydraulic motions in a downhole drilling environment. The distance between these transceivers are dependent on the wireless communication technologies used, the power provided by the power generator, the downhole environment and the power management circuit of the microcontroller amongst other variables. This transceiver array transmits data, from one transceiver to another as in a relay, from the bottom to the surface of the well.

Due to the increased speed of wireless communication compared to mud pulse telemetry more data can be sent per second increasing the resolution of the data obtained at the surface.

Sensors can be integrated with the communication module described in the above example embodiments. This is achievable since the sensors and the transmitters do not operate simultaneously. Once a tool stops it operation it can shut down and go to sleep to reduce power usage. The instructions to do so are handled by the microcontroller unit. The smart drill pipe gives real time distributed sensing data, which can be used to effectively monitor the well and respond immediately if there is a problem. The number and type of sensors in a communication module depend on the availability of power at each communication module.

Example embodiments described in the above sections also describe downhole power generation systems sufficient to supply required power for downhole sensors and instrumentation. The system is not affected by in-situ mud types. It is therefore designed to be a self-powered power generator, particularly suitable for utilization in high temperature (>125° C.) environments. Accordingly, one example embodiment is a high temperature downhole power generator (HT-DPG) on a miniature mobile device (MMD) that generates electricity. The HT-DPG uses mechanical and hydraulic energies in a typical well to generate friction between two materials of opposite polarities and creates power to power the downhole sensors to monitor and track information concerning the well. The materials may be made of Copper, Aluminum, PTFE, Teflon, Kapton, Lead, Elastomer, PDMA, or any other material that can cause static electricity. The shapes of the materials, which may be in the form of blocks, can be rectangular, triangular, circular or any shape that maximizes the contact area depending on the design of the system. The system may also include a microcontroller and transceiver unit (MTU) that manages the power generated and controls the communication of information from the MMD through the well to other transceivers. The information is stored on memory on board of the MMD and can be transferred once the MMD is out of the well or the information can be sent through wireless technologies through various transceivers throughout the well.

Another example embodiment is a high temperature, downhole power generator (HT-DPG) designed to generate electricity by using friction between two materials of opposite polarities or polarities as distant as possible from each other. Movement in a drilling environment, such as vibration and mud flow, may generate friction between two materials. One example embodiment provides for how the HT-DPG provides power to downhole sensors and instrumentation (S&I) and how the integration of HT-DPG and S&I paves the way for self-powered S&I systems.

Advancements in MEMS (micro-electro-mechanical systems) technology have paved the way for building these devices at the micro/nano scale and then integrating them together to create low-cost, miniature, smart, MMDs that can be used in challenging applications. Miniature Mobile Devices (MMDs) are useful in downhole applications because they can be deployed down a well with mud flow to measure downhole parameters. They can flow right to the bottom of a well and up again to the surface therefore, providing a full profile of the wellbore. In the embodiments disclosed above, examples of how MMDs provide clear advantages over current technologies such as wireline and MWD/LWD with respect to size, cost, sensitivity, power, mobility and potential downhole applications are shown. The present disclosure describes how energy can be harvested by the motion of MMDs in a flow and how this energy can be converted to electricity to power the sensors, instrumentation and communication module in the devices. It also describes several applications of these MMDs such as sensing, actuating, monitoring as well as transmitting and receiving data in a downhole environment.

The Specification, which includes the Summary, Brief Description of the Drawings and the Detailed Description, and the appended claims refer to particular features (including process or method steps) of the disclosure. Those of skill in the art understand that the invention includes all possible combinations and uses of particular features described in the Specification. Those of skill in the art understand that the disclosure is not limited to or by the description of embodiments given in the Specification.

Those of skill in the art also understand that the terminology used for describing particular embodiments does not limit the scope or breadth of the disclosure. In interpreting the Specification and appended claims, all terms should be interpreted in the broadest possible manner consistent with the context of each term. All technical and scientific terms used in the Specification and appended claims have the same meaning as commonly understood by one of ordinary skill in the art to which this invention belongs unless defined otherwise.

As used in the Specification and appended claims, the singular forms "a," "an," and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

The systems and methods described herein, therefore, are well adapted to carry out the objects and attain the ends and advantages mentioned, as well as others inherent therein. While example embodiments of the system and method have been given for purposes of disclosure, numerous changes exist in the details of procedures for accomplishing the desired results. These and other similar modifications may readily suggest themselves to those skilled in the art, and are intended to be encompassed within the spirit of the system and method disclosed herein and the scope of the appended claims.

The invention claimed is:

1. A high temperature, self-powered, miniature mobile device for wirelessly monitoring well conditions, the device comprising:
   a power generator including a first material of one polarity and a second material that is fixed in position relative to the first material and is of opposite polarity of the first material, wherein the first material is configured to be propelled towards and separated, or slid against and separated from the second material upon motion of the miniature mobile device so that the two materials have a maximized point of contact to generate maximum power, wherein the device is configured to be deployed down a well with mud flow to measure downhole parameters, and wherein the motion is caused due to the mud flow carrying the miniature mobile device;
   at least one electrode that is connected to the first material or second material;
   a bridge rectifier connected to the at least one electrode to transform the power generated into direct current from alternating current;
   a storage unit for storing the power generated by the power generator;
   at least one sensor that gathers information concerning a downhole environment; and
   a microcontroller and transceiver unit to manage the power generated by the power generator and transmit information gathered by the at least one sensor, wherein the at least one sensor is operatively coupled to the microcontroller.

2. The device of claim 1, further comprising
   a shell for housing at least one of the following:
   the power generator, the at least one electrode, the bridge rectifier, the storage unit, the at least one sensor, and the microcontroller and transceiver unit,
   wherein the shell comprises a material that withstands high temperatures.

3. A system for wirelessly monitoring well conditions, the system comprising:
   a plurality of high temperature miniature mobile devices wirelessly connected to a computer on a drilling surface, wherein the plurality of high temperature miniature mobile devices are deployed down a well with mud flow to measure downhole parameters, each of the plurality of high temperature miniature mobile devices comprising:
   a power generator including a first material of one polarity and a second material that is fixed in position relative to the first material and is of opposite polarity of the first material, wherein the first material is configured to be propelled towards and separated, or slid against and separated from the second material upon motion of the miniature mobile devices so that the two materials have a maximized point of contact to generate maximum power, wherein the motion is caused due to mud flow carrying the miniature mobile devices;
   at least one electrode that is connected to the first material or second material;
   a bridge rectifier connected to the at least one electrode to transform the power generated into direct current from alternating current;
   a storage unit for storing the power generated by the power generator;
   at least one sensor that gathers information concerning a downhole environment; and
   a microcontroller and transceiver unit to manage the power generated by the power generator and transmit information gathered by the at least one sensor, wherein the at least one sensor is operatively coupled to the microcontroller.

4. The system of claim 3, further comprising:
   a string of wireless transceivers placed along a drill string inside a well, each transceiver placed within at least half the distance that each transceiver can transmit data and configured to communicate wirelessly with the plurality of high temperature miniature mobile devices.

5. The system of claim 4, wherein the string of wireless transceivers are configured to:
   receive measurement data from one of the high temperature miniature mobile devices; and
   transmit the measurement data to another wireless transceiver closer to the computer on the drilling surface.

6. The system of claim 3, further comprising:
   one or more downhole tools placed along a drill string inside a well for being activated, deactivated, or configured by one of the high temperature miniature mobile devices when the device is within a predetermined distance from the tool,
   or a downhole tool to activate, deactivate or configure one of the high temperature miniature mobile devices when the device is within a predetermined distance from the tool.

7. The system of claim 3, further comprising:
   a sleeve formed on an outer surface of a drill string, the sleeve adapted to move downwards in response to hydraulic or mechanical pressure, wherein the sleeve comprises an outer valve for securing the plurality of high temperature miniature mobile devices in the body of the sleeve and releasing the plurality of high temperature miniature mobile devices when opened.

8. The system of claim 3, wherein the first material is suspended using one or more coil springs.

9. The system of claim 3, wherein the motion is caused due to vibration, rotation, or noise in a drill string carrying the miniature mobile devices.

10. The system of claim 3, further comprising a turbine operatively coupled to the first material for causing the first material to move towards the second material or away from the second material.

11. The system of claim 3, wherein the storage unit comprises one of ceramic film capacitors, electrolytic capacitors, supercapacitors, double-layer capacitors, or pseudo-capacitors.

12. The system of claim 3, wherein the first material and the second material are comprised of a material that causes static electricity.

13. The system of claim 12, wherein the first material and the second material are selected from the group consisting of Copper, Aluminum, Polytetrafluoroethylene (PTFE), Polyimide, Lead, Elastomer, Polydimethylacrylamide (PDMA), Nylon, and Polyester.

14. The system of claim 3, wherein the first material and the second material comprise a fire-resistant material.

15. The system of claim 3, further comprising
a shell for housing at least one of the following: the power generator, the at least one electrode, the bridge rectifier, the storage unit, the at least one sensor, and the microcontroller and transceiver unit, wherein the shell comprises a material that withstands high temperatures.

16. The system of claim 3, wherein the transceiver unit is configured to communicate over a wireless communication method selected from the group consisting of Wi-Fi, Wi-Fi Direct, Bluetooth, Bluetooth Low Energy, and ZigBee.

17. A method for wirelessly monitoring well conditions, the method comprising:
wirelessly connecting a plurality of high temperature miniature mobile devices to a computer on a drilling surface;
deploying the plurality of high temperature miniature mobile devices down a well with mud flow to measure downhole parameters, each of the plurality of high temperature miniature mobile devices comprising:
a power generator including a first material of one polarity and a second material that is fixed in position relative to the first material and is of opposite polarity of the first material, wherein the first material is propelled towards and separated, or slid against and separated from the second material upon motion of the miniature mobile devices so that the two materials have a maximized point of contact to generate maximum power, wherein the motion is caused due to the mud flow carrying the miniature mobile devices;
at least one electrode that is connected to the first material or second material;
a bridge rectifier connected to the at least one electrode to transform the power generated into direct current from alternating current;
a storage unit for storing the power generated by the power generator;
at least one sensor that gathers information concerning a downhole environment; and
a microcontroller and transceiver unit to manage the power generated by the power generator; and
transmitting information gathered by the at least one sensor, wherein the at least one sensor is operatively coupled to the microcontroller.

18. The method of claim 17, further comprising:
installing a string of wireless transceivers along a drill string inside a well, each transceiver being installed within at least half the distance that each transceiver can transmit data, wherein the wireless transceivers are configured to communicate wirelessly with the plurality of high temperature miniature mobile devices.

19. The method of claim 18, wherein the string of wireless transceivers are configured to:
receive measurement data from one of the high temperature miniature mobile devices; and
transmit the measurement data to another wireless transceiver closer to the computer on the drilling surface.

20. The method of claim 18, further comprising:
installing one or more downhole tools along a drill string inside a well for being activated, deactivated, or configured by one of the high temperature miniature mobile devices when the device is within a predetermined distance from the tool,
or a downhole tool to activate, deactivate or configure one of the high temperature miniature mobile devices when the device is within a predetermined distance from the tool.

21. The method of claim 18, further comprising:
providing a sleeve on an outer surface of a drill string, the sleeve adapted to move downwards in response to hydraulic or mechanical pressure, wherein the sleeve comprises an outer valve for securing the plurality of high temperature miniature mobile devices in the body of the sleeve; and
releasing the plurality of high temperature miniature mobile devices upon opening the outer valve.

22. The method of claim 18, wherein the first material is suspended using one or more coil springs.

23. The method of claim 18, wherein the motion is caused due to vibration, rotation, or noise in a drill string carrying the miniature mobile devices.

24. The method of claim 18, further comprising:
operatively coupling a turbine to the first material for causing the first material to move towards the second material or away from the second material.

25. The method of claim 18, wherein the storage unit comprises one of ceramic film capacitors, electrolytic capacitors, supercapacitors, double-layer capacitors, or pseudo-capacitors.

26. The method of claim 18, wherein the first material and the second material are selected from the group consisting of Copper, Aluminum, Polytetrafluoroethylene (PTFE), Polyimide, Lead, Elastomer, Polydimethylacrylamide (PDMA), Nylon, Polyester, a fire-resistant material, or a material that causes static electricity.

27. The method of claim 18, further comprising:
providing a first housing for housing the power generator, the electrode, and the bridge rectifier, wherein the first housing comprises a polymeric material; and
providing a second housing for housing the storage unit, microcontroller, and the transceiver unit, wherein the second housing comprises a material selected from the group consisting of certain solids, transition metals, as well as high strength alloys and/or compounds of the transition metals, and high temperature dewars.

28. The method of claim 18, wherein the transceiver unit is configured to communicate over a wireless communication method selected from the group consisting of Wi-Fi, Wi-Fi Direct, Bluetooth, Bluetooth Low Energy, and ZigBee.

* * * * *